US012651744B2

(12) United States Patent
Liao et al.

(10) Patent No.: US 12,651,744 B2
(45) Date of Patent: Jun. 9, 2026

(54) ANODE MATERIAL, ELECTROCHEMICAL DEVICE AND ELECTRONIC DEVICE COMPRISING THE SAME

(71) Applicant: Ningde Amperex Technology Limited, Ningde (CN)

(72) Inventors: Qunchao Liao, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 538 days.

(21) Appl. No.: 17/742,715

(22) Filed: May 12, 2022

(65) Prior Publication Data

US 2022/0271281 A1 Aug. 25, 2022

Related U.S. Application Data

(63) Continuation of application No. PCT/CN2019/121737, filed on Nov. 28, 2019.

(51) Int. Cl.
| | |
|---|---|
| *H01M 4/583* | (2010.01) |
| *H01M 4/36* | (2006.01) |
| *H01M 4/38* | (2006.01) |
| *H01M 4/02* | (2006.01) |
| *H01M 10/0525* | (2010.01) |

(52) U.S. Cl.
CPC .......... *H01M 4/386* (2013.01); *H01M 4/366* (2013.01); *H01M 4/583* (2013.01); *H01M 2004/021* (2013.01); *H01M 2004/027* (2013.01); *H01M 10/0525* (2013.01)

(58) Field of Classification Search
CPC ...... H01M 4/386; H01M 4/366; H01M 4/583; H01M 10/0525; H01M 2004/021; H01M 2004/027; H01M 4/134; H01M 4/62; Y02E 60/10
See application file for complete search history.

(56) References Cited

U.S. PATENT DOCUMENTS

| | | | |
|---|---|---|---|
| 10,361,432 | B2 | 7/2019 | Takaichi et al. |
| 2015/0325847 | A1 | 11/2015 | Kang |
| 2018/0175377 | A1* | 6/2018 | Hirose .................. H01M 4/386 |

(Continued)

FOREIGN PATENT DOCUMENTS

| | | |
|---|---|---|
| CN | 102683662 A | 9/2012 |
| CN | 103078141 A | 5/2013 |

(Continued)

OTHER PUBLICATIONS

Machine translation of CN 103229336, retrieved from <www.espacenet.com> on Sep. 4, 2024.*

(Continued)

*Primary Examiner* — Cynthia K Walls
(74) *Attorney, Agent, or Firm* — Maier & Maier, PLLC

(57) ABSTRACT

An anode material includes silicon-based particles and graphite particles, wherein the average sphericity degree of the graphite particles is A, the average sphericity degree of the silicon-based particles is B, and A and B meet: $0<B-A\leq0.3$. The anode material has good cycle performance, and the battery prepared with the anode material has better rate performance and lower deformation rate.

15 Claims, 6 Drawing Sheets

(56) References Cited

U.S. PATENT DOCUMENTS

| | | | | |
|---|---|---|---|---|
| 2019/0273248 A1* | 9/2019 | Yamada | ................ | H01M 4/131 |
| 2020/0243848 A1* | 7/2020 | Kim | ..................... | H01M 4/587 |

FOREIGN PATENT DOCUMENTS

| | | | |
|---|---|---|---|
| CN | 103229336 A | 7/2013 | |
| CN | 105229828 A | 1/2016 | |
| CN | 105706278 A | 6/2016 | |
| CN | 106299236 A | 1/2017 | |
| CN | 106536408 A | 3/2017 | |
| CN | 107221673 A | 9/2017 | |
| CN | 107710467 A | 2/2018 | |
| CN | 107887582 A | 4/2018 | |
| CN | 107925074 A | 4/2018 | |
| CN | 108780885 A | 11/2018 | |
| CN | 109301184 A | 2/2019 | |
| CN | 109417163 A | 3/2019 | |
| CN | 109638254 A | 4/2019 | |
| CN | 109841823 A | 6/2019 | |
| CN | 110444750 A | 11/2019 | |
| JP | 2004323284 A | 11/2004 | |
| JP | 2011096455 A | 5/2011 | |
| JP | 2014167906 A | 9/2014 | |
| JP | 2015038862 A | 2/2015 | |
| JP | 2015185491 A | 10/2015 | |
| JP | 201754660 A | 3/2017 | |
| JP | 6127817 B2 | 5/2017 | |
| JP | 2017183113 A | 10/2017 | |
| JP | 2017533533 A | 11/2017 | |
| JP | 2017536676 A | 12/2017 | |
| WO | 2014188851 A1 | 11/2014 | |
| WO | 2016136543 A1 | 9/2016 | |
| WO | 2017216558 A1 | 12/2017 | |
| WO | WO-2019/108039 * | 6/2019 | .............. H01M 4/36 |
| WO | 2019220576 A1 | 11/2019 | |

OTHER PUBLICATIONS

Machine translation of CN 109638254, retrieved from <www.espacenet.com> on Sep. 4, 2024.*

Machine translation of CN 102122708, retrieved from <www.espacenet.com> on Sep. 3, 2024.*

Machine translation of CN 109301184, retrieved from <www.espacenet.com> on Sep. 3, 2025.*

Office Action issued on Dec. 16, 2020, in connection with corresponding Chinese Application No. 201911194865.5 (35 pp., including machine-generated English translation).

Office Action issued on Apr. 16, 2021, in connection with corresponding Chinese Application No. 201911194865.5 (11 pp., including machine-generated English translation).

Office Action issued on Apr. 19, 2022, in connection with corresponding Chinese Application No. 2019110804980.0 (10 pp., including machine-generated English translation).

International Search Report (with English translation) and Written Opinion (with Machine Translation) issued on Aug. 28, 2020 in corresponding International Patent Application No. PCT/CN2019/121737; 16 pages.

Extended Search Report issued on Aug. 17, 2022, in corresponding European U.S. Appl. No. 19/954,154., 8 pages.

Office Action issued on Sep. 6, 2022, in corresponding Japanese Application No. 2021-540588, 7 pages.

Office Action issued on Mar. 22, 2023, in corresponding Japanese Application No. 2021-540588, 5 pages.

* cited by examiner

ANODE MATERIAL, ELECTROCHEMICAL DEVICE AND ELECTRONIC DEVICE COMPRISING THE SAME

CROSS-REFERENCE TO RELATED ARTS

This application is a continuation of PCT application PCT/CN2019/121737 filed on Nov. 28, 2019, the disclosure of which is hereby incorporated by reference in its entirety.

BACKGROUND

1. Technical Field

The present application relates to the field of energy storage, and particularly to an anode material, an electrochemical device and an electronic device comprising the anode material, particularly, lithium ion batteries.

2. Description of the Related Art

With the popularization of consumer electronic products, such as notebook computers, mobile phones, tablet computers, mobile power supplies, and unmanned aerial vehicles, the requirements for electrochemical devices used therein are becoming stricter. For example, a battery is not only required to be light in weight, but is also required to have high capacity and a relatively long service life. Lithium ion batteries have occupied a leading position in the market due to their outstanding advantages, such as high energy density, excellent safety, no memory effect and long service life.

SUMMARY

Embodiments of the present application provide an anode material and a method for preparing the anode material, to solve at least one of the problems existing in related art to some extent. The embodiments of the present application also provide an anode using the anode material, an electrochemical device, and an electronic device.

In an embodiment, the present invention provides an anode material, which comprises silicon-based particles and graphite particles, wherein the average sphericity degree of the graphite particles is A, the average sphericity degree of the silicon-based particles is B, and A and B meet: about $0 < B - A \leq$ about 0.3.

In another embodiment, the present application provides an anode, which comprises an anode material according to an embodiment of the present application.

In another embodiment, the present application provides an electrochemical device, which comprises an anode according to an embodiment of the present application.

In another embodiment, the present application provides an electronic device, which comprises an electrochemical device according to an embodiment of the present application.

In the present application, starting from a reasonable match between the silicon-based material and the graphite material, the cycle performance and deformation rate of the battery are significantly improved by limiting the sphericity degree of the silicon-based particles and the graphite particles.

Additional aspects and advantages of the embodiments of the present application will be partly described or shown in the following description or interpreted by implementing the embodiments of the present application.

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings show only some of the embodiments of the present application. For those skilled in the art, the drawings of other embodiments can still be obtained according to the structures illustrated in the drawings without any creative effort.

DETAILED DESCRIPTION

Figure 1A:
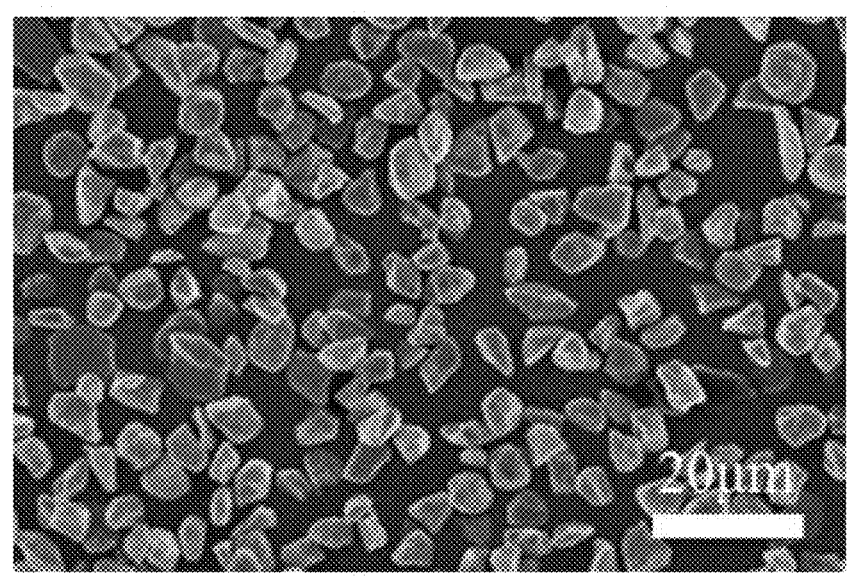
FIG. 1A shows a scanning electron microscopy (SEM) image of silicon oxide $SiO_x$ in Example 1.

The embodiments of the present application will be described in detail below. The embodiments of the present application should not be interpreted as limitations to the present application.

As used in the present application, the terms "about" is used for describing and explaining a small variation. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the present application, Dv50 is the particle size corresponding to a cumulative volume percentage of the anode active material that is 50%, and the unit is μm.

In the present application, Dn10 is the particle size corresponding to a cumulative number percentage of the anode active material that is 10%, and the unit is μm.

In the present application, the silicon composite comprises elemental silicon, a silicon compound, a mixture of elemental silicon and a silicon compound, or a mixture of various silicides.

In the present application, sphericity degree refers to the ratio of the shortest diameter to the longest diameter of a particle.

In the present application, the "capacity per gram of the anode" refers to the capacity per gram of the anode active material used to prepare the anode. For example, the anode active material in an embodiment of the present application is a mixture of graphite and a silicon-based anode active material, then the "capacity per gram of the anode" refers to the capacity per gram of this mixture.

In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

In the detailed description and claims, a list of items connected by the term "one of" or the like means any one of the listed items. For example, if items A and B are listed, the phrase "one of A and B" means only A or only B. In another example, if items A, B, and C are listed, then the phrase "one of A, B, and C" means only A; only B; or only C. Item A may include a single or multiple elements. Item B may include a single or multiple elements. Item C may include a single or multiple elements.

In the detailed description and claims, a list of items connected by the term "at least one of" or the like means any combination of the listed items. For example, if items A and B are listed, the phrase "at least one of A and B" means only A; only B; or A and B. In another example, if items A, B, and C are listed, then the phrase "at least one of A, B, and C" means only A; only B; only C; A and B (excluding C); A and C (excluding B); B and C (excluding A); or A, B, and C. Item A may include a single or multiple elements. Item B may include a single or multiple elements. Item C may include a single or multiple elements.

I. Anode Material

In an embodiment, the present invention provides an anode material, which comprises silicon-based particles and graphite particles, wherein the average sphericity degree of the graphite particles is A, the average sphericity degree of the silicon-based particles is B, and A and B meet: about $0.1 \le B - A \le$ about $0.3$.

In some embodiments, the value of B–A is about 0.1, about 0.15, about 0.18, about 0.20, about 0.22, about 0.25, or about 0.28.

In some embodiments, the silicon-based particles have an average sphericity degree of about 0.8 to 1.0. In some embodiments, the silicon-based particles have an average sphericity degree of about 0.85, about 0.88, about 0.90, about 0.92 or about 0.95.

In some embodiments, the number of silicon-based particles having a sphericity degree of less than about 0.8 accounts for about 10% or less of the total number of the silicon-based particles. In some embodiments, the number of silicon-based particles having a sphericity degree of less than about 0.8 accounts for about 9% or less, about 8% or less, about 7% or less, about 6% or less, about 5% or less, or about 4% or less of the total number of the silicon-based particles.

In some embodiments, the graphite particles have an average sphericity degree of about 0.5 to 0.8. In some embodiments, the graphite particles have an average sphericity degree of about 0.53, about 0.55, about 0.58, about 0.60, about 0.62, about 0.65, or about 0.75.

In some embodiments, the number of graphite particles having a sphericity degree of about 0.5 to 0.75 accounts for about 90% or more of the total number of the graphite particles. In some embodiments, the number of graphite particles having a sphericity degree of about 0.5 to 0.8 accounts for about 92% or more, about 93% or more, about 94% or more, about 95% or more, about 96% or more, about 97% or more, or about 98% or more of the total number of the graphite particles.

In some embodiments, in the X-ray diffraction pattern of the silicon-based particles, the highest intensity at $2\theta$ within the range of about $28.0°$ to $29.5°$ is $I_2$, and the highest intensity at $2\theta$ within the range of about $20.0°$ to $22.0°$ is $I_1$, wherein about $0 < I_2/I_1 \le$ about 1.

In some embodiments, in the X-ray diffraction pattern of the silicon-based particles, the highest intensity at $2\theta$ of about $28.4°$ is $I_2$, and the highest intensity at $2\theta$ of about $21.0°$ is $I_1$, wherein about $0 < I_2/I_1 \le$ about 1. In some embodiments, the $I_2/I_1$ value is about 0.2, about 0.4, about 0.6 or about 0.8.

In some embodiments, the Dv50 of the silicon-based particles is from about 2.0 to 15 μm. In some embodiments, the Dv50 of the silicon-based particles is from about 4 to 10 μm. In some embodiments, the Dv50 of the silicon-based particles is from about 5 to 8 μm. In some embodiments, the Dv50 of the silicon-based particles is about 3 μm, about 6 μm, about 7 μm, about 9 μm, about 12 μm, or about 14 μm.

In some embodiments, the silicon-based particles have a particle size distribution meeting: about $0.3 \le Dn10/Dv50 \le$ about 0.6. In some embodiments, the silicon-based particles have a particle size distribution meeting: about $0.4 \le Dn10/Dv50 \le$ about 0.5. In some embodiments, the silicon-based particles have a particle size distribution of about 0.35, about 0.45, or about 0.55.

In some embodiments, the silicon-based particles comprise a silicon composite substrate and an oxide $MeO_y$ layer, wherein the oxide $MeO_y$ layer is coated on at least a portion of the silicon composite substrate, wherein Me includes at least one of Al, Si, Ti, Mn, V, Cr, Co or Zr, and y is 0.5 to 3; and wherein the oxide $MeO_y$ layer comprises a carbon material.

In some embodiments, the oxide $MeO_y$ includes $Al_2O_3$, $TiO_2$, $ZrO$, $MnO$, $Mn_2O_3$, $Mn_3O_4$, $Co_3O_4$, $Cr_2O_3$, $SiO_2$ or any combination thereof.

In some embodiments, the carbon material in the oxide $MeO_y$ layer includes amorphous carbon, carbon nanotubes, carbon nanoparticles, carbon fibers, graphene, or any combination thereof. In some embodiments, the amorphous carbon is a carbon material obtained by sintering a carbon precursor at high temperature. In some embodiments, the carbon precursor includes polyvinylpyrrolidone, sodium carboxymethyl cellulose, polyvinyl alcohol, polypropylene, phenolic resin, polyester resin, polyamide resin, epoxy resin, polyurethane, polyacrylic resin or any combination thereof.

In some embodiments, the silicon-based particles further comprise a polymer layer that covers at least a portion of the oxide MeOy layer, wherein the polymer layer comprises a carbon material. In some embodiments, the polymer layer can be directly coated on the surface of the silicon composite substrate. That is, the silicon-based particles include only the silicon composite substrate and the polymer layer.

In some embodiments, the polymer layer comprises polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide or any combination thereof.

In some embodiments, the silicon composite substrate comprises particles that can intercalate and deintercalate lithium ions. In some embodiments, the silicon composite substrate comprises a silicon-containing substance. The silicon-containing substance in the silicon composite substrate can form a composite with one or more of other substances than the silicon-containing substance in the anode material.

In some embodiments, the silicon composite substrate comprises $SiO_x$, wherein about $0.6 \leq x \leq$ about 1.5.

In some embodiments, the silicon composite substrate comprises nano-Si crystalline grains, SiO, $SiO_2$, or any combination thereof.

In some embodiments, the particle size of the nano-Si crystalline grains is less than about 100 nm. In some embodiments, the particle size of the nano-Si crystalline grains is less than about 50 nm. In some embodiments, the particle size of the nano-Si crystalline grains is less than about 20 nm. In some embodiments, the particle size of the nano-Si crystalline grains is less than about 5 nm. In some embodiments, the particle size of the nano-Si crystalline grains is less than about 2 nm.

In some embodiments, the thickness of the oxide $MeO_y$ layer is about 0.5 nm to 900 nm. In some embodiments, the thickness of the oxide $MeO_y$ layer is about 1 nm to 800 nm. In some embodiments, the thickness of the oxide $MeO_y$ layer is about 1 nm to 100 nm. In some embodiments, the thickness of the oxide $MeO_y$ layer is about 1 nm to 20 nm. In some embodiments, the thickness of the oxide $MeO_y$ layer is about 2 nm, about 10 nm, about 20 nm, about 50 nm, about 60 nm, about 70 nm, about 80 nm, about 90 nm or about 100 nm.

In some embodiments, based on the total weight of the silicon-based particles, the weight percentage of the Me element is about 0.005 to 1.5 wt %. In some embodiments, based on the total weight of the silicon-based particles, the weight percentage of the Me element is about 0.01 to 1.2 wt %. In some embodiments, based on the total weight of the silicon-based particles, the weight percentage of the Me element is about 0.02 to 1.0 wt %. In some embodiments, based on the total weight of the silicon-based particles, the weight percentage of the Me element is about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, or about 0.9 wt %.

In some embodiments, based on the total weight of the silicon-based particles, the weight percentage of the carbon material in the oxide $MeO_y$ layer is about 0.01 to 1.5 wt %. In some embodiments, based on the total weight of the silicon-based particles, the weight percentage of the carbon material in the oxide $MeO_y$ layer is about 0.1 to 1.0 wt %. In some embodiments, based on the total weight of the silicon-based particles, the weight percentage of the carbon material in the oxide $MeO_y$ layer is about 0.2 to 0.9 wt %. In some embodiments, based on the total weight of the silicon-based particles, the weight percentage of the carbon material in the oxide $MeO_y$ layer is about 0.3 wt %, about 0.4 wt %, about 0.5 wt %, about 0.6 wt %, about 0.7 wt % or about 0.8 wt %.

In some embodiments, the carbon material in the polymer layer includes, carbon nanotubes, carbon nanoparticles, carbon fibers, graphene, or any combination thereof.

In some embodiments, based on the total weight of the silicon-based particles, the weight percentage of the polymer layer is about 0.05 to 6 wt %. In some embodiments, based on the total weight of the silicon-based particles, the weight percentage of the polymer layer is about 0.1 to 5 wt %. In some embodiments, based on the total weight of the silicon-based particles, the weight percentage of the polymer layer is about 0.5 to 4 wt %. In some embodiments, based on the total weight of the silicon-based particles, the weight percentage of the polymer layer is about 1, about 1.5, about 2, about 2.5 or about 3.0 wt %.

In some embodiments, the thickness of the polymer layer is about 1 to 150 nm. In some embodiments, the thickness of the polymer layer is about 5 to 120 nm. In some embodiments, the thickness of the polymer layer is about 10 to 100 nm. In some embodiments, the thickness of the polymer layer is about 15 nm, about 20 nm, about 30 nm, about 40 nm, about 50 nm, about 60 nm, about 70 nm, about 80 nm or about 90 nm.

In some embodiments, the anode material has a specific surface area of about 1 to 50 $m^2/g$. In some embodiments, the anode material has a specific surface area of about 5 to 40 $m^2/g$. In some embodiments, the anode material has a specific surface area of about 10 to 30 $m^2/g$. In some embodiments, the anode material has a specific surface area of about 1 $m^2/g$, about 5 $m^2/g$, or about 10 $m^2/g$.

In some embodiments, the graphite particles have the scattering peak $I_{1330}$ at about 1330 $cm^{-1}$ and the scattering peak $I_{1580}$ at about 1580 $cm^{-1}$ in Raman spectroscopy, wherein the $I_{1330}/I_{1580}$ ratio meets: about $0.7 < I_{1330}/I_{1580} <$ about 2.0.

In some embodiments, the $I_{1330}/I_{1580}$ ratio meets: about $0.8 < I_{1330}/I_{1580} <$ about 1.8. In some embodiments, the $I_{1330}/I_{1580}$ ratio meets: about $1 < I_{1330}/I_{1580} <$ about 1.5.

In some embodiments, the graphite particles have a particle size Dv50 of about 0.01 to 90 μm. In some embodiments, the graphite particles have a particle size Dv50 of about 1 to 80 μm. In some embodiments, the graphite particles have a particle size Dv50 of about 5 to 70 μm. In some embodiments, the graphite particles have a particle size Dv50 of about 10 to 60 μm. In some embodiments, the graphite particles have a particle size Dv50 of about 15 μm, about 20 μm, about 25 μm, about 30 μm, about 35 μm, about 40 μm or about 45 μm.

In some embodiments, the graphite particles have a specific surface area of about 30 $m^2/g$ or less. In some embodiments, the graphite particles have a specific surface area of about 25 $m^2/g$ or less. In some embodiments, the graphite particles have a specific surface area of about 20 $m^2/g$ or less. In some embodiments, the graphite particles have a specific surface area of about 15 $m^2/g$ or less.

In some embodiments, the X-ray diffraction pattern of the graphite particles includes a 004 diffraction line profile and a 110 diffraction line profile. The c-axis length C004 of the unit cell can be obtained from the 004 diffraction line profile, and the a-axis length C110 of the unit cell can be obtained from the 110 diffraction line profile. The ratio C004/C110 is the orientation index (OI) of the graphite particles, and the OI value of the graphite particles is about 1 to 30.

In some embodiments, the graphite particles have an OI value of about 1 to 20. In some embodiments, the graphite particles have an OI value of about 5, about 10, or about 15.

In some embodiments, the method for preparing the silicon-based particles meeting about $0 < I_2/I_1 \leq$ about 1 comprises:

(1) mixing silicon dioxide and metal silicon powder at a molar ratio of about 1:5 to 5:1 to obtain a mixed material;

(2) heating the mixed material under about $10^{-4}$ to $10^{-1}$ kPa at a temperature range of about 1100-1500° C. for about 0.5 to 20 hr to obtain a gas;

(3) condensing the gas obtained to obtain a solid;

(4) crushing and screening the solid to obtain silicon-based particles; and (5) heat-treating the solid at a temperature range of about 400 to 1500° C. for about 1 to 20 hr, and cooling the heat-treated solid to obtain the silicon-based particles.

In some embodiments, the molar ratio of silicon dioxide to the metal silicon powder is about 1:4 to 4:1. In some embodiments, the molar ratio of silicon dioxide to the metal silicon powder is about 1:3 to 3:1. In some embodiments, the molar ratio of silicon dioxide to the metal silicon powder is about 1:2 to 2:1. In some embodiments, the molar ratio of silicon dioxide to the metal silicon powder is about 1:1.

In some embodiments, the pressure is in the range of about $10^{-4}$ to $10^{-1}$ kPa. In some embodiments, the pressure is about 1 Pa, about 10 Pa, about 20 Pa, about 30 Pa, about 40 Pa, about 50 Pa, about 60 Pa, about 70 Pa, about 80 Pa, about 90 Pa or about 100 Pa.

In some embodiments, the heating temperature is about 1100 to 1450° C. In some embodiments, the heating temperature is about 1200° C., about 1250° C., about 1300° C. or about 1400° C.

In some embodiments, the heating time is about 1 to 20 hr. In some embodiments, the heating temperature is about 5 to 16 hr. In some embodiments, the heating time is about 2, about 4, about 6, about 8, about 10, about 12, about 14, about 15 or about 18 hr.

In some embodiments, the mixing is performed in a ball mill, a V-type mixer, a three-dimensional mixer, an airflow mixer or a horizontal mixer.

In some embodiments, the heating is carried out under an inert gas atmosphere. In some embodiments, the inert gas includes nitrogen, argon, helium or a combination thereof.

In some embodiments, the heat-treatment temperature is about 400 to 1200° C. In some embodiments, the heat-treatment temperature is about 500° C., about 600° C., about 700° C., about 800° C., about 900° C. or about 1000° C.

In some embodiments, the heat-treatment time is about 1 to 18 hr. In some embodiments, the thermal treatment time is about 2 to 12 hr. In some embodiments, the heat-treatment time is about 3, about 5, about 8, about 10, about 12 or about 15 hr.

In some embodiments, the method for preparing the silicon-based particles having an oxide $MeO_y$ layer on the surface comprises:

(6) forming the above graded solid or a commercial silicon oxide $SiO_x$, a carbon precursor and an oxide precursor $MeT_r$, into a mixed solution in the presence of an organic solvent and deionized water;

(7) drying the mixed solution to obtain powder; and (8) sintering the powder at about 250 to 1000° C. for about 0.5 to 20 hr, to obtain silicon-based particles with an oxide $MeO_y$ layer on the surface, wherein x is about 0.5 to 1.5; and y is about 0.5 to 3, wherein Me includes at least one of Al, Si, Ti, Mn, Cr, V, Co or Zr, wherein T includes at least one of methoxy, ethoxy, isopropoxy or halogen, and wherein n is 1, 2, 3 or 4.

In some embodiments, the oxide precursor $MeT_r$, includes isopropyl titanate, aluminum isopropoxide, or a combination thereof.

In some embodiments, the carbon material includes amorphous carbon, carbon nanotubes, carbon nanoparticles, carbon fibers, graphene, or any combination thereof. In some embodiments, the amorphous carbon is a carbon material obtained by sintering a carbon precursor at high temperature. In some embodiments, the carbon precursor includes polyvinylpyrrolidone, sodium carboxymethyl cellulose, polyvinyl alcohol, polypropylene, phenolic resin, polyester resin, polyamide resin, epoxy resin, polyurethane, polyacrylic resin or any combination thereof.

In some embodiments, the sintering temperature is about 300 to 900° C. In some embodiments, the sintering temperature is about 350 to 700° C. In some embodiments, the sintering temperature is about 400 to 650° C. In some embodiments, the sintering temperature is about 450° C., about 500° C., about 600° C., about 750° C. or about 800° C.

In some embodiments, the sintering time is about 1 to 20 hr. In some embodiments, the sintering time is about 1 to 15 hr. In some embodiments, the sintering time is about 1 to 10 hr. In some embodiments, the sintering time is about 1 to 5 hr. In some embodiments, the sintering time is about 2, about 3, about 4, about 6, about 8 or about 12 hr.

In some embodiments, the organic solvent includes at least one of ethanol, methanol, n-hexane, N,N-dimethylformamide, pyrrolidone, acetone, toluene, isopropanol or n-propanol. In some embodiments, the organic solvent is ethanol.

In some embodiments, the halogen includes F, Cl, Br, or a combination thereof.

In some embodiments, the sintering is carried out under an inert gas atmosphere. In some embodiments, the inert gas includes nitrogen, argon, or a combination thereof.

In some embodiments, the drying is spray drying at a temperature of about 100 to 300° C.

In some embodiments, the method for preparing the silicon-based particles having a polymer layer on the surface comprises:

(9) dispersing the above-mentioned crushed and screened solid, a commercial silicon oxide $SiO_x$, or the silicon-based particles with an oxide $MeO_y$ layer on the surface, a carbon material and a polymer in a solvent at high speed for 1 to 15 hr to obtain a suspension liquid; and

(10) removing the solvent from the suspension liquid, wherein x is about 0.5 to 1.5.

In some embodiments, the dispersing time is about 2, about 3, about 4, about 5, about 6, about 7, about 8 or about 10 hr.

In some embodiments, the polymer comprises polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide or any combination thereof.

In some embodiments, the carbon material includes, carbon nanotubes, carbon nanoparticles, carbon fibers, graphene, or any combination thereof.

In some embodiments, the solvent includes water, ethanol, methanol, tetrahydrofuran, acetone, chloroform, N-methylpyrrolidone, dimethylformamide, dimethylacetamide, toluene, xylene or any combination thereof.

Figure 1B:
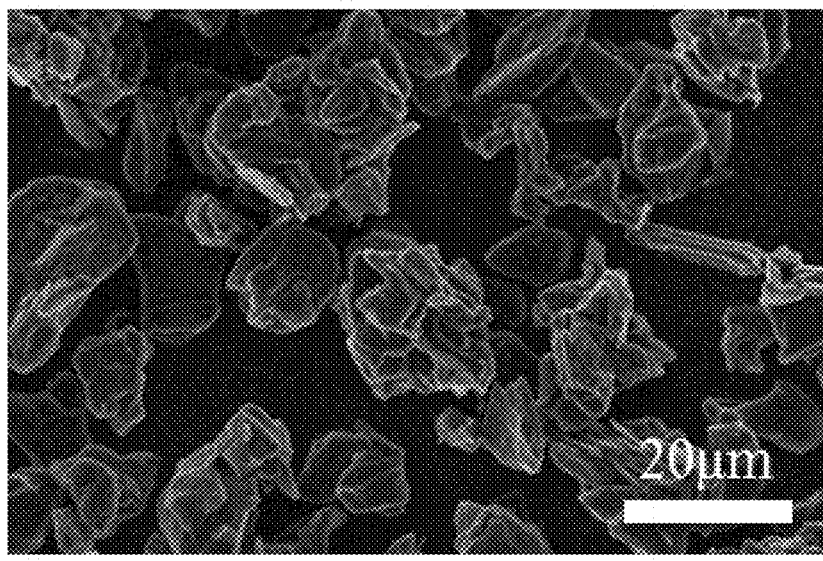
FIG. 1B shows an SEM image of graphite particles in Example 1.
Figure 1C:
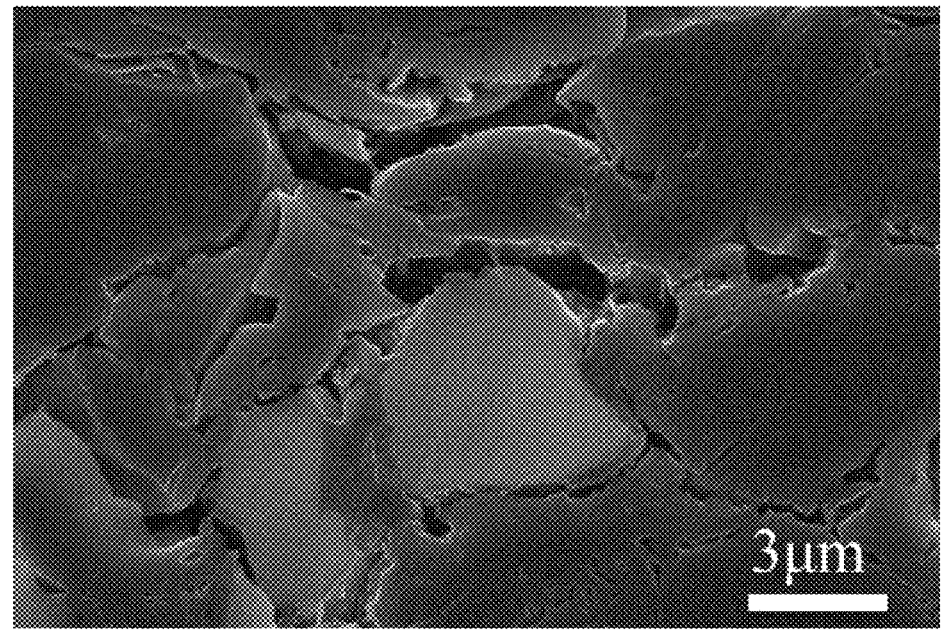
FIG. 1C shows an SEM image of a portion of a cross section of the anode in Example 1.
Figure 2A:
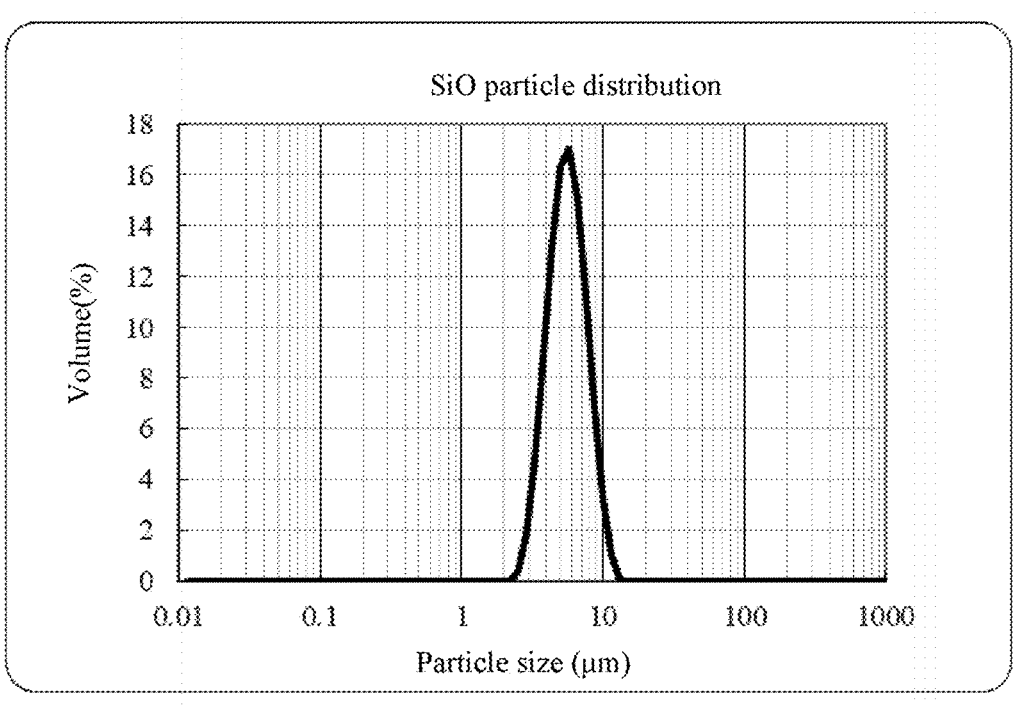
FIG. 2A shows the particle size distribution curve of the silicon oxide $SiO_x$ in Example 1.
Figure 2B:
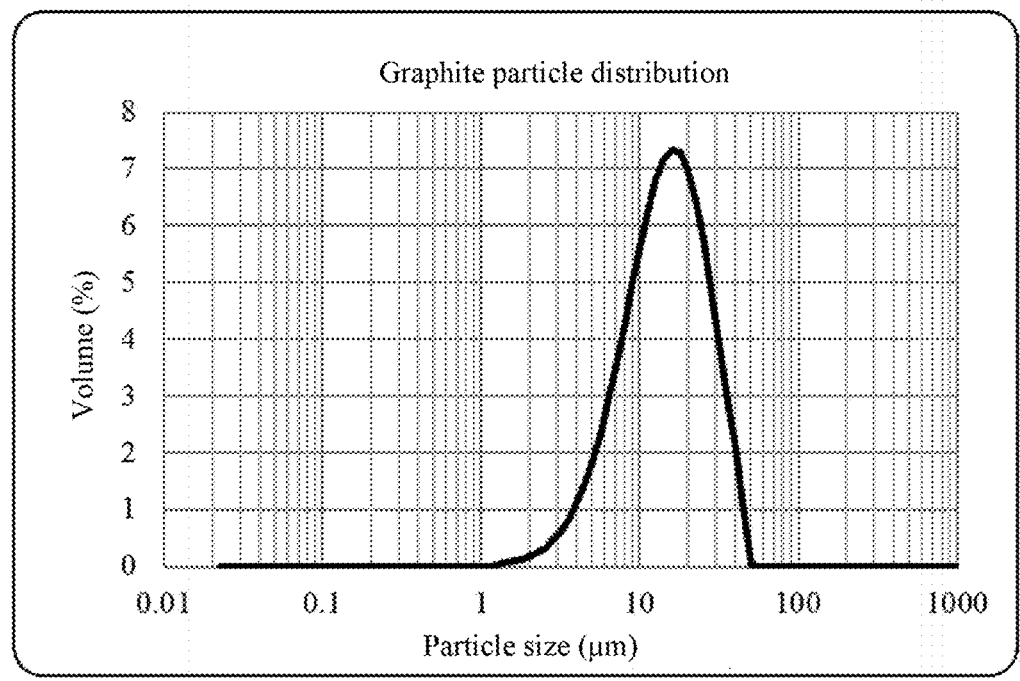
FIG. 2B shows the particle size distribution curve of graphite in Example 1.

FIG. 1A shows an SEM image of a silicon oxide $SiO_x$ in Example 1; FIG. 1B shows an SEM image of graphite particles in Example 1; and FIGS. 1C and 1D show an SEM image of a portion of an anode in Example 1 respectively. FIG. 2A shows the particle size distribution curve of the silicon oxide $SiO_x$ in Example 1; and FIG. 2B shows the particle size distribution curve of graphite in Example 1.

In industry, a silicon oxide material and a graphite material are usually mixed at a certain ratio to prepare an anode. Persons skilled in the art usually only focuses on improving the silicon oxide material to improve the performance of the anode, but ignores the influence of a reasonable match of the silicon oxide particles and the graphite particles on the performance of the anode. The silicon oxide particles and the graphite particles have different volume swelling during lithium intercalation. It is found in the present application that by reasonably matching the silicon oxide particles and the graphite particles in the anode, the overall swelling stress of the anode can be evenly dispersed, and the silicon oxide particles are filled in the gap between the graphite particles, such that the silicon oxide particles and the the graphite particles interlock with each other like gears, thereby increasing the compaction density of the anode, inhibiting the displacement of particles due to swelling, reducing the deformation of the anode, and increasing the cycle life of the battery. Therefore, the reasonable match of the silicon oxide particles and the graphite particles has great significance for improving the performance of the battery.

Figure 3A:
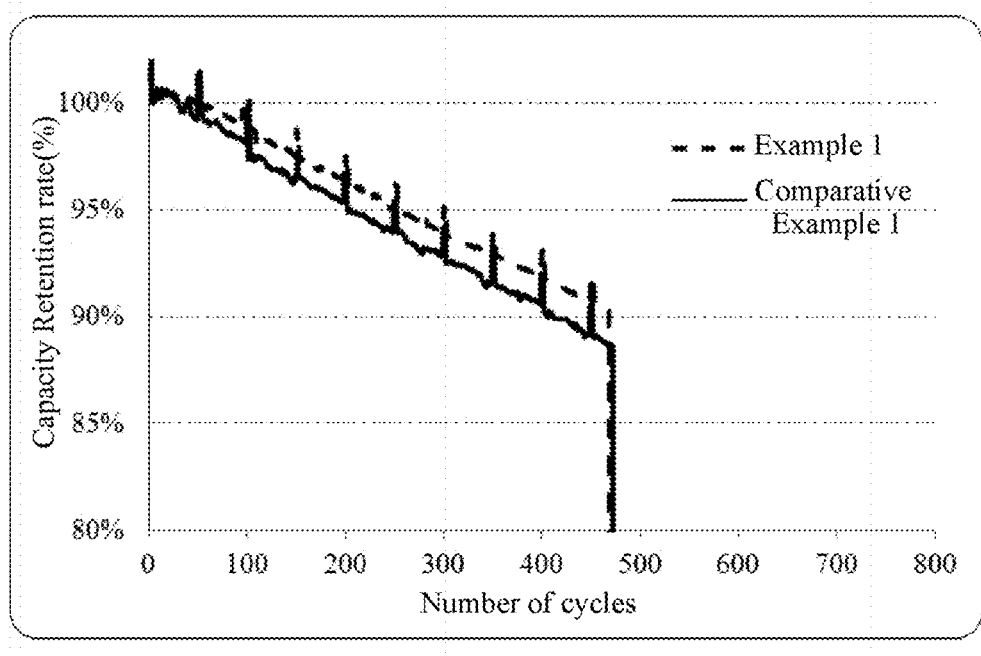
FIG. 3A shows the capacity attenuation curves of the lithium ion batteries in Example 1 and Comparative Example 1.
Figure 3B:
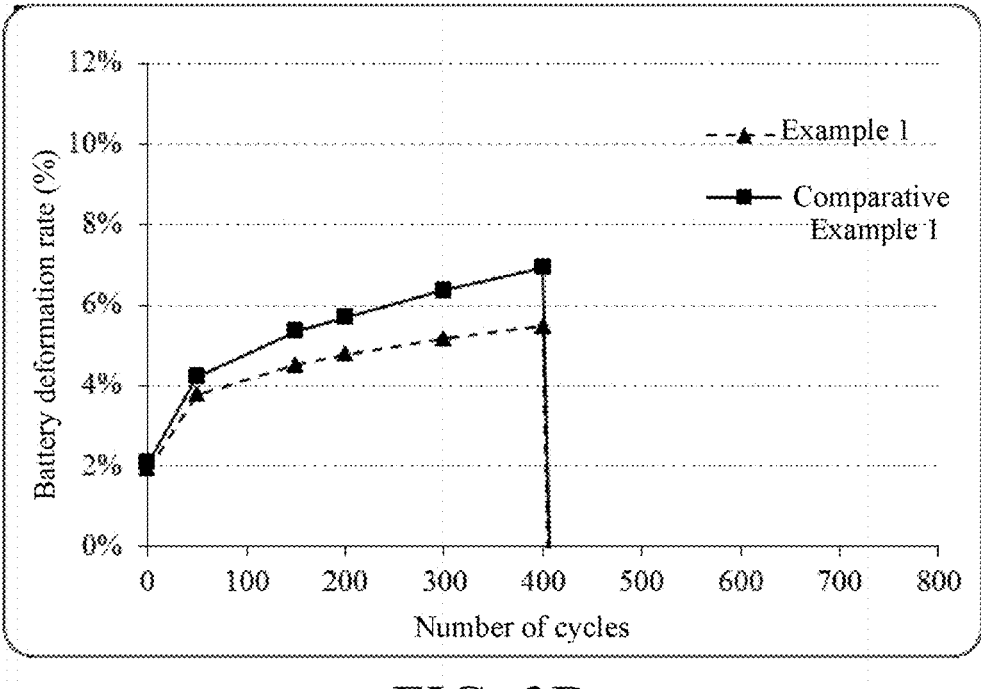
FIG. 3B shows the deformation curves of the batteries in Example 1 and Comparative Example 1.

FIG. 3A shows the capacity attenuation curves of the lithium ion batteries in Example 1 and Comparative Example 1; and FIG. 3B shows the deformation curves of the lithium ion batteries in Example 1 and Comparative Example 1.

As can be seen from FIG. 3A, the capacity retention rate in Example 1 is higher than that in Comparative Example 1. As can be seen from FIG. 3B, the deformation rate of the battery in Example 1 is lower than the deformation rate of the battery in Comparative Example 1.

Figure 3C:
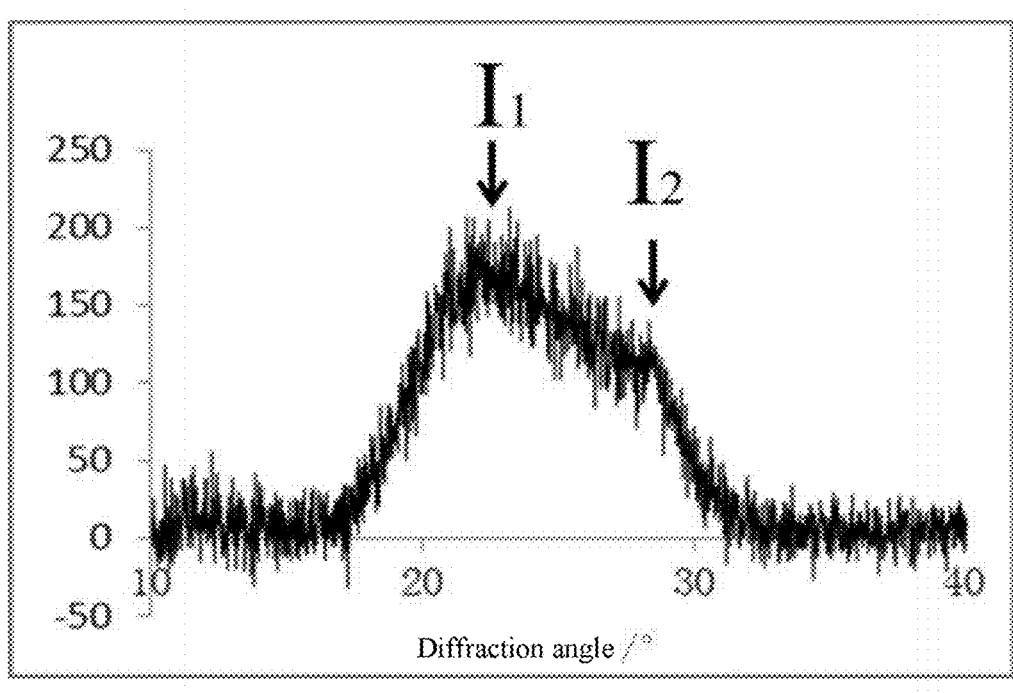
FIG. 3C shows an X-ray diffraction (XRD) pattern of the anode active material in Example 10.

FIG. 3C shows an X-ray diffraction (XRD) pattern of an anode active material in Example 10 of the present application. As can be seen from FIG. 3C, in the X-ray diffraction pattern of the anode active material, the highest intensity at $2\theta$ within the range of about 28.0° to 29.0° is $I_2$, and the highest intensity at $2\theta$ within the range of about 20.5° to 21.5° is $I_1$, wherein about $0<I_2/I_1\leq$about 1. The $I_2/I_1$ value reflects the influence degree of disproportionation to the material. The larger the $I_2/I_1$ value is, the larger the size of the nano-silicon crystalline grains inside the anode active material will be. When the $I_2/I_1$ value is greater than about 1, the stress in a local region of the anode active material will sharply increase during intercalation of the lithium, so that the structure of the anode active material is degraded during the cycle process. In addition, due to the generation of the distribution of nanocrystals, the diffusion capacity of the ions in the grain boundary during diffusion of the ions will be affected. The inventors of the present application finds that when the $I_2/I_1$ value meets about $0<I_2/I_1\leq$about 1, the anode active material has good cycle performance, and the lithium ion battery prepared with the same has good swelling resistance.

Figure 3D:
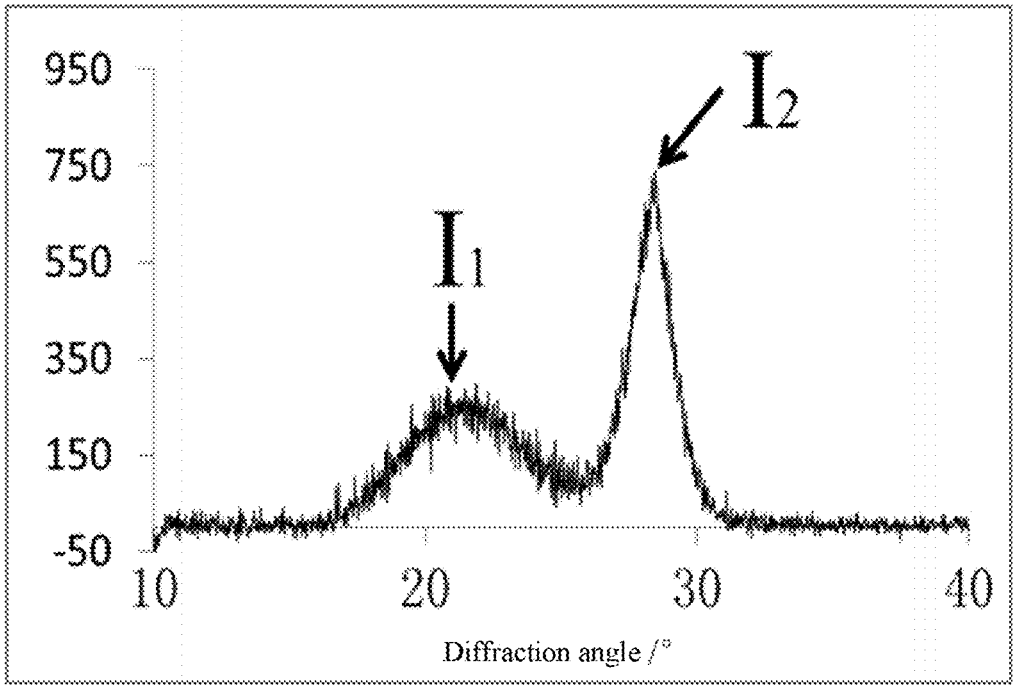
FIG. 3D shows an X-ray diffraction pattern of the anode active material in Comparative Example 4.

FIG. 3D shows an X-ray diffraction (XRD) pattern of an anode active material in Comparative Example 4 of the present application. It can be seen from FIG. 3D that the anode active material of Comparative Example 4 has an $I_2/I_1$ value that is significantly greater than 1. Compared with the anode active material of Example 1, the anode active material of Comparative Example 4 has poor cycle performance, and the lithium ion battery prepared therewith has a high swelling rate and poor rate performance.

Figures 4, 5:
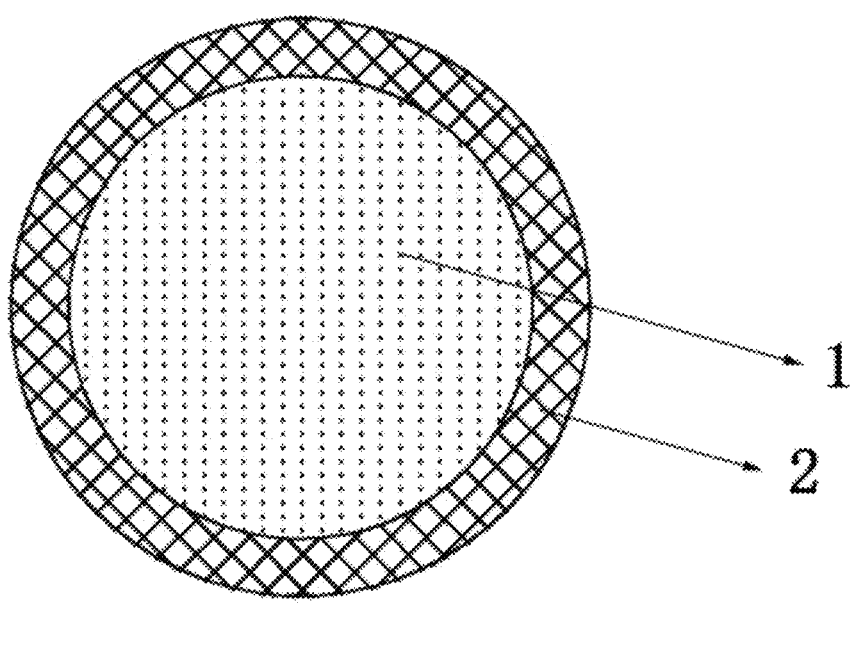
FIG. 4 illustrates a schematic structural diagram of an anode active material in an example of the present application.
FIG. 5 illustrates a schematic structural diagram of an anode active material in another example of the present application.

FIG. 4 illustrates a schematic structural diagram of an anode active material in an example of the present application. The inner layer 1 is a silicon composite substrate, and the outer layer 2 is an oxide $MeO_y$ layer containing a carbon material.

The oxide $MeO_y$ layer coating the silicon composite substrate can act as an HF trapping agent, and the oxide can react with HF in the electrolytic solution to reduce the weight percentage of HF in the electrolytic solution during the cycle process, and reduce the etching of HF on the surface of the silicon material, thereby further improving the cycle performance of the material. Doping a certain amount of carbon in the oxide $MeO_y$ layer can enhance the conductivity of the anode active material, and reduce the polarization during the cycle.

FIG. 5 illustrates a schematic structural diagram of an anode active material in another example of the present application. The inner layer 1 is a silicon composite substrate, the middle layer 2 is an oxide $MeO_y$ layer containing a carbon material, and the outer layer 3 is a polymer layer containing a carbon material. The anode active material of the present application may only have the silicon composite substrate and the polymer layer, but is free of $MeO_y$ layer. That is, the polymer layer of the present application can be directly coated on the surface of the silicon composite substrate.

When a polymer layer containing carbon nanotubes (CNT) is coated on the surface of the anode active material, the CNTs can be bound to the surface of the anode active material by the polymer, which is beneficial for the improvement of the interface stability on the surface of the anode active material and constrains the migration of the silicon-based particles, thereby improving the cycle performance and reducing the deformation.

II. Anode

In some embodiments, the anode includes a current collector and an anode active material layer on the current collector. The anode active material layer includes an anode material according to the embodiments of the present application.

In some embodiments, the anode active material layer comprises a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylic styrene butadiene rubber, epoxy resin, Nylon and so on.

In some embodiments, the anode active material layer comprises a conductive material. In some embodiments, the conductive material includes, but is not limited to, natural graphite; artificial graphite; carbon black; acetylene black; Ketjen black; carbon fibers; a metal powder; metal fibers; copper; nickel; aluminum; silver; or polyphenylene derivatives.

In some embodiments, the current collector includes, but is not limited to, a copper foil, a nickel foil, a stainless steel foil, a titanium foil, nickel foam, copper foam, or a polymeric substrate coated with a conductive metal.

In some embodiments, the anode can be obtained by mixing an active material, a conductive material, and a binder in a solvent to prepare an active material composition, and coating the active material composition on a current collector.

In some embodiments, the solvent may include, but is not limited to, N-methylpyrrolidone or the like.

III. Cathode

A material capable of being applied to a cathode in the embodiment of the present application, a composition and a preparation method thereof include any technology disclosed in prior art. In some embodiments, the cathode is a cathode disclosed in U.S. Pat. No. 9,812,739B, which is incorporated into the present application by full text reference.

In some embodiments, the cathode includes a current collector and a cathode active material layer on the current collector.

In some embodiments, the cathode active material includes, but is not limited to, lithium cobalt oxide (LiCoO$_2$), lithium nickel cobalt manganese (NCM) ternary material, lithium iron phosphate (LiFePO$_4$), or lithium manganese oxide (LiMn$_2$O$_4$).

In some embodiments, the cathode active material layer further comprises a binder, and optionally a conductive material. The binder improves the binding of the cathode active material particles to each other and the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylated styrene-butadiene rubber, epoxy resins, Nylon and so on.

In some embodiments, the conductive material includes, but is not limited to, a carbon based material, a metal based material, a conductive polymer, and a mixture thereof. In some embodiments, the carbon-based material is selected from natural graphite, artificial graphite, carbon black, acetylene black, Ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector includes, but is not limited to, aluminum.

The cathode may be prepared by a preparation method well known in the art. For example, the cathode can be obtained by the following method: mixing an active material, a conductive material and a binder in a solvent to prepare an active material composition, and coating the active material composition on a current collector. In some embodiments, the solvent may include, but is not limited to, N-methylpyrrolidone or the like.

IV. Electrolytic Solution

The electrolytic solution that can be used in the embodiments of the present application may be any electrolytic solution known in prior art.

In some embodiments, the electrolytic solution comprises an organic solvent, a lithium salt, and an additive. The organic solvent used in the electrolytic solution according to the present application may be any organic solvent known in the art and capable of serving as a solvent for an electrolytic solution. The electrolyte used in the electrolytic solution according to the present application is not limited, and may be any electrolyte known in the art. The additive used in the electrolytic solution according to the present application may be any additive known in the art and capable of serving as an additive for an electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of an organic lithium salt or an inorganic lithium salt.

In some embodiments, the lithium salt includes, but is not limited to, lithium hexafluorophosphate (LiPF$_6$), lithium tetrafluoroborate (LiBF$_4$), lithium difluorophosphate (LiPO$_2$F$_2$), lithium bis(trifluoromethanesulfonyl)imide LiN (CF$_3$SO$_2$)$_2$ (LiTFSI), lithium bis(fluorosulfonyl)imide Li(N (SO$_2$F)$_2$(LiFSI), lithium bis(oxalato)borate LiB(C$_2$O$_4$)$_2$ (LiBOB), or lithium difluoro(oxalato)borate LiBF$_2$(C$_2$O$_4$) (LiDFOB).

In some embodiments, the concentration of the lithium salt in the electrolyticsolution is about 0.5 to 3 mol/L, about 0.5 to 2 mol/L, or about 0.8 to 1.5 mol/L.

V. Separator

In some embodiments, a separator is disposed between the cathode and the anode to prevent a short circuit. The material and shape of the separator that can be used in the embodiments of the present application are not particularly limited, and may be any technology disclosed in prior art. In some embodiments, the separator includes a polymer or an inorganic substance formed by a material stable in the electrolytic solution of the present application.

For example, the separator may include a substrate layer and a surface treatment layer. The substrate layer is a non-woven fabric, a film, or a composite film having a porous structure. The material of the substrate layer is selected from at least one of polyethylene, polypropylene, polyethylene terephthalate, and polyimide. Specifically, a porous polypropylene film, a porous polyethylene film, a polypropylene non-woven fabric, a polyethylene non-woven fabric, or a porous polypropylene-polyethylene-polypropylene composite film may be used.

The surface treatment layer is disposed on at least one surface of the substrate layer.

The surface treatment layer may be a polymer layer or an inorganic substance layer, or a layer formed by mixing the polymer and the inorganic substance.

The inorganic substance layer includes inorganic particles and a binder. The inorganic particles are one or a combination of several selected from the group consisting of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is one or a combination of several selected from the group consisting of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is selected from at least one of a polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

VI. Electrochemical Device

The embodiments of the present application provide an electrochemical device including any device that undergoes an electrochemical reaction.

In some embodiments, the electrochemical device of the present application includes a cathode having a cathode active material capable of occluding and releasing metal ions; an anode according to the embodiments of the present application; an electrolytic solution; and a separator disposed between the cathode and the anode.

In some embodiments, the electrochemical device of the present application includes, but is not limited to, all types of primary batteries, secondary batteries, fuel cells, solar cells, or capacitors.

In some embodiments, the electrochemical device is a lithium secondary battery.

In some embodiments, the lithium secondary battery includes, but is not limited to, a lithium metal secondary battery, a lithium ion secondary battery, a lithium polymer secondary battery or a lithium ion polymer secondary battery.

VII. Electronic Device

The electronic device of the present application may be any device using the electrochemical device according to the embodiments of the present application.

In some embodiments, the electronic device includes, but is not limited to, a notebook computer, a pen input computer, a mobile computer, an e-book player, a portable phone, a portable fax machine, a portable copy machine, a portable printer, a stereo headphone, a video recorder, a liquid crystal display television, a portable cleaner, a portable CD player, a minidisc player, a transceiver, an electronic notebook, a calculator, a memory card, a portable recorder, a radio, a backup power supply, a motor, a car, a motorcycle, a power-assisted bicycle, a bicycle, a lighting fixture, a toy, a game console, a clock, an electric tool, a flash light, a camera, a large household storage battery, or a lithium ion capacitor, and the like.

The lithium ion battery is taken as an example and the preparation of the lithium ion battery is described in conjunction with specific embodiments. Those skilled in the art would understand that the preparation method described in the present application is only an example, and any other suitable preparation methods are within the scope of the present application.

Embodiment

The following describes embodiments of the lithium-ion battery according to the present application and comparative examples for performance evaluation.
I. Performance Evaluation Method for Anode Active Materials
1. Test Method for Powder Properties of Anode Active Materials
(1) Microscopic Morphology Observation of Powder Particles:

The microscopic morphology of powder was observed by scanning electron microscopy to characterize the coating on the surface of the material. The test instrument was an OXFORD EDS (X-max-20 mm$^2$), the acceleration voltage was 15 kV, the focal length was adjusted, the observation was made at 50K high magnification, and the agglomeration condition of the particles was observed at a low magnification of 500 to 2000.
(2) Sphericity Degree Test:

The images of a certain number (more than 5000) of dispersed particles were captured and processed by the Malvern automatic image particle size analyzer, and then the microstructure and morphology of the particles were accurately analyzed by morphologically-directed Raman spectroscopy (MDRS), to obtain the longest diameter and shortest diameter of all particles. The ratio of the shortest diameter to longest diameter of each particle was calculated to obtain the sphericity degree of each particle, and the sphericity degrees of all particles were averaged to obtain the average sphericity degree.
(3) Specific Surface Area Test:

At a constant low temperature, after the adsorption amounts of gas on a solid surface at different relative pressures were measured, the adsorption amount of a monomolecular layer of a test sample was obtained based on the Brunauer-Emmett-Teller adsorption theory and its formula (BET formula), thereby calculating the specific surface area of the solid.

About 1.5 to 3.5 g of a powder sample was loaded into a test sample tube of a TriStar II 3020, and then was degassed at about 200° C. for 120 min and then tested.
(4) Particle Size Test:

About 0.02 g of the powder sample was added to a 50 mL clean beaker, about 20 mL of deionized water was added, and then a few drops of 1% surfactant was added to disperse the powder completely in water. Performing an ultrasonic treatment for 5 min in a 120 W ultrasonic cleaning machine, the particle size distribution was then measured by a MasterSizer 2000.
(5) Carbon Content Test:

The sample was heated and burned in a high-frequency furnace at a high temperature under an oxygen-enriched atmosphere to oxidize carbon and sulfur into carbon dioxide and sulfur dioxide, respectively. The gas was allowed to enter a corresponding absorption tank after treatment, and the corresponding infrared radiation was absorbed and converted into a corresponding signal by the detector. This signal was sampled by a computer, and converted into a value proportional to the concentration of carbon dioxide and sulfur dioxide after linear correction, and then the values throughout the entire analysis process were accumulated. After the analysis was completed, the accumulated value was divided by the weight in the computer, and then multiplied by the correction coefficient, and the blank was subtracted, to obtain the percentage content of carbon and sulfur in the sample. The sample was tested using a Shanghai Dekai HCS-140 high-frequency infrared carbon-sulfur analyzer.
(6) Xrd Test:

1 to 2.0 g of the sample was added to into a groove of a glass sample holder, compacted and flattened with a glass sheet, and tested using a Brook D8 X-ray diffractometer according to JJS K 0131-1996 "General rules for X-ray diffraction analysis". The test voltage was 40 kV, the current was 30 mA, the scanning angle was in the range of 10–85°, the scanning step size was 0.0167°, and the time for each step was 0.24 s. An XRD pattern was obtained, from which the highest intensity $I_2$ at 2θ of 28.4° and the highest intensity $I_1$ at 2θ of 21.0° were obtained, and the ratio of $I_2/I_1$ was calculated.
(7) Metal Element Test:

A certain amount of the sample was weighed, added with an amount of concentrated nitric acid, and digested under microwave to obtain a solution. The obtained solution and filter residue were washed multiple times and diluted to a certain volume. The plasma intensities of the metal elements were tested by ICP-OES, the metal contents in the solution were calculated according to the standard curves of the tested metals, and then the amounts of the metal elements contained in the material were calculated.

(8) Anode Porosity Test:

The anode was cut into a disc with a diameter of 13 mm by a punching machine, and the thickness of the disc was measured by a tenthousandth micrometer. A certain number of discs were put into a sample compartment of the AccuPyc 1340 instrument, and purged 30 times with helium. Then, helium was introduced according to program. The pressure in the sample compartment was tested, and the true volume in the sample compartment was calculated according to Boyle's Law $PV=nRT$. After the test, the discs were counted and the apparent volume of the samples was calculated. The porosity of the sample was calculated by the formula: $1-$true volume/apparent volume.

The weight percentage of each substance in the following tables was calculated based on the total weight of the anode active material.

II. Test Method of Electrical Properties of Anode Active Material

2. Test Method for Button Battery

Under a dry argon atmosphere, $LiPF_6$ was added to a mixed solvent of propylene carbonate (PC), ethylene carbonate (EC), and diethyl carbonate (DEC) (at a weight ratio of about 1:1:1), and then uniformly mixed, wherein the concentration of $LiPF_6$ was about 1.15 mol/L. About 7.5 wt % of fluoroethylene carbonate (FEC) was added, and mixed uniformly to obtain an electrolytic solution.

The anode active material obtained in the examples and comparative examples, conductive carbon black and a modified polyacrylic acid (PAA) binder were added to deionized water at a weight ratio of about 80:10:10, and were stirred to form a slurry. A scraper was used for coating to form a coating layer with a thickness of 100 μm. The coating layer was dried in a vacuum drying oven at about 85° C. for about 12 hr, and then cut into a wafer with a diameter of about 1 cm with a stamping machine in a dry environment. In a glove box, a lithium metal sheet was used as a counter electrode, and a Celgard composite membrane was used as a separator, and an electrolytic solution was added to assemble a button battery. A LAND series battery test was used to perform charge and discharge tests on the battery to test the charge and discharge capacity of the battery.

The cell was discharged to 0.005 V at 0.05 C, allowed to stand for 5 min, discharged to 0.005 V at 50 μA, allowed to stand for another 5 min, and discharged to 0.005 V at 10 μA, to obtain the first lithium-intercalation capacity of the material. Then, the cell was charged to 2 V at 0.1 C, to obtain the first lithium-deintercalation capacity. Finally, the first lithium deintercalation capacity was divided by the first lithium intercalation capacity to obtain the first efficiency of the material.

2. Whole Battery Test

(11) Preparation of the Lithium-Ion Battery

Preparation of the Cathode:

$LiCoO_2$, conductive carbon black and polyvinylidene fluoride (PVDF) were fully stirred and mixed in an N-methylpyrrolidone solvent system at a weight ratio of about 95%:2.5%:2.5%, to prepare a cathode slurry. The cathode slurry prepared was coated on an aluminum foil as a cathode current collector, dried, and then cold-pressed to obtain the cathode.

Preparation of the Anode:

Graphite, the silicon-based anode active material prepared according to the examples and comparative examples, a conductive agent (conductive carbon black, Super P®), and the PAA binder were mixed at a weight ratio of about 95%:1.2%:5%:3.8%, an appropriate amount of water was added, and kneaded at a solid content of about 30-60 wt %. An appropriate amount of water was added to adjust the viscosity of the slurry to about 2000-3000 Pa·s, to prepare an anode slurry.

The anode slurry prepared was coated on a copper foil as an anode current collector, dried, and then cold-pressed to obtain the anode.

Preparation of Electrolytic Solution

Under a dry argon atmosphere, $LiPF_6$ was added to a mixed solvent of propylene carbonate (PC), ethylene carbonate (EC), and diethyl carbonate (DEC) (at a weight ratio of about 1:1:1), and uniformly mixed, wherein the concentration of $LiPF_6$ was about 1.15 mol/L. About 7.5 wt % of fluoroethylene carbonate (FEC) was added, and uniformly mixed to obtain an electrolytic solution.

Preparation of the Separator

A porous PE polymer film was used as a separator.

Preparation of the Lithium-Ion Battery

The cathode, separator, and anode were stacked in an order such that the separator was located between the cathode and anode to isolate the cathode and anode, and a battery cell was obtained by winding. The battery cell was placed in an outer package, and the electrolytic solution was injected, and the outer package was packaged. After formation, degassing, trimming and other processes, the lithium ion battery was obtained.

(2) Cycle Performance Test:

The test temperature was 25/45° C. The battery was charged to 4.4 V at a constant current of 0.7 C and then charged to 0.025 C at a constant voltage, allowed to stand for 5 min, and discharged to 3.0 V at 0.5 C. The capacity obtained in this step was the initial capacity. The cycle of charge at 0.7 C/discharge at 0.5 C was repeated, and ratio of the capacity of each step to the initial capacity was obtained, from which a capacity attenuation curve was obtained. The cycle number at 25° C. to a capacity retention rate of 90% was recorded as the room-temperature cycle performance of the battery, and the cycle number at 45° C. to a capacity retention rate of 80% was recorded as the high-temperature cycle performance of the battery. The cycle performances of the materials were compared by comparing the cycle number in the above two conditions.

(3) Discharge Rate Test:

At 25° C., the battery was discharged to 3.0 V at 0.2 C, allowed to stand for 5 min, charged to 4.45 V at 0.5 C, charged to 0.05 C at a constant voltage, and allowed to stand for 5 min. The discharge rate was adjusted, and the battery was respectively discharged at 0.2 C, 0.5 C, 1 C, 1.5 C, and 2.0 C, to obtain the discharge capacity. The capacity obtained at each rate and the capacity obtained at 0.2 C were compared. The rate performance was compared by comparing the ratios at 2 C and 0.2 C.

(4) Deformation Rate Test of the Battery after Full Charge

The thickness of a fresh battery of half charge (50% state of charge (SOC)) was measured by a micrometer screw. After 400 cycles, the thickness of the battery of full charge (100% SOC) was measured again by a micrometer screw, and compared with the thickness of the initial fresh battery of half charge (50% SOC), to obtain the deformation rate of the fully charged (100% SOC) battery at this time.

III. Composition and Performance Test Result of the Anode

1. A commercial silicon oxide $SiO_x$ ($0.5<x<1.5$, Dv50=about 5.3 μm) and graphite particles (Dv50=about 14.0 μm) were selected to prepare the anodes of Examples 1 to 3 and Comparative Example 1 according to the above method.

Table 1-1 shows the compositions of the anodes in Examples 1 to 5 and Comparative Example 1.

TABLE 1-1

| No. | Average sphericity degree A of graphite particles | Average sphericity degree B of silicon-based particles | B − A | Specific surface area $(m^2 \cdot g^{-1})$ | Capacity per gram of anode*(mAh $\cdot$ g$^{-1}$) | First efficiency (%) |
|---|---|---|---|---|---|---|
| Example 1 | 0.68 | 0.92 | 0.24 | 1.28 | 501 | 82.1% |
| Example 2 | 0.68 | 0.86 | 0.18 | 1.31 | 501 | 81.8% |
| Example 3 | 0.68 | 0.80 | 0.12 | 1.28 | 502 | 81.9% |
| Example 4 | 0.60 | 0.86 | 0.26 | 1.07 | 500 | 81.5% |
| Example 5 | 0.78 | 0.86 | 0.08 | 1.01 | 501 | 81.6% |
| Comparative Example 1 | 0.55 | 0.92 | 0.37 | 1.1 | 500 | 81.3% |

*The capacity per gram here is the capacity obtained when the lithium deintercalation cut-off voltage is 2.0 V (the same below).

Table 1-2 shows the performance test results of lithium ion batteries prepared with the anodes in Examples 1 to 5 and Comparative Example 1.

TABLE 1-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 2 | 91.1% | 87.2% | 7.2% | 8.3% | 86.1% |
| Example 3 | 89.6% | 86.4% | 8.2% | 9.2% | 85.1% |
| Example 4 | 91.1% | 87.2% | 6.8% | 8.3% | 84.1% |
| Example 5 | 89.6% | 86.4% | 8.2% | 9.2% | 87.1% |
| Comparative Example 1 | 83.9% | 81.7% | 9.2% | 10.5% | 87.2% |

It can be seen from the test results of Examples 1 to 5 and Comparative Example 1 that when the difference between average sphericity degree of the silicon-based particles and the graphite particles is about 0.3 or less, the cycle performance, deformation resistance and rate performance of the lithium ion batteries prepared with the same are significantly better than those of lithium ion batteries with a difference between average sphericity degree of greater than 0.3.

This is because when the difference between average sphericity degree of the silicon-based particles and the graphite particles is about 0.3 or less, the difference between the morphologies can be effectively utilized to increase the maximum compaction density of the anode material and improve the energy density of the battery cell. In addition, the rearrangement of particles during swelling and contraction is suppressed, the pores between the particles are reduced, the electrical contact between graphite particles and silicon-based particles are strengthened, and the cycle performance and deformation resistance of the battery are improved.

2. The anodes in Examples 6 to 8 and Comparative Example 2 were prepared as follows:

(1) Silicon dioxide and metal silicon powder were mixed at a molar ratio of about 1:1 through mechanical dry-mixing and ball milling to obtain a mixed material;

(2) The mixed material was heated at a temperature range of about 1100 to 1550° C. under an Ara atmosphere under a pressure of about $10^{-3}$ to $10^{-1}$ kPa for about 0.5 to 20 hr to obtain a gas;

(3) The gas obtained was condensed to obtain a solid;

(4) The solid was crushed and screened; and (5) The solid was heat-treated at a temperature range of 400 to 1500° C. for about 1 to 20 hr, and the heat-treated solid was cooled to obtain a silicon oxide material SiO$_x$, which is used as the silicon-based anode active material; and (6) The anodes in Examples 6-8 and Comparative Example 2 were prepared according to the above method, wherein the average sphericity degree of the silicon-based particles and graphite particles is about 0.92 and about 0.68, respectively.

Table 2-1 shows the specific process parameters in Steps (1)-(5).

TABLE 2-1

| No. | SiO$_2$:Si (molar ratio) | Pressure (Pa) | Heating temperature (° C.) | Heating time (h) | Classification treatment | Thermal treatment after classification |
|---|---|---|---|---|---|---|
| Example 6 | 1:1 | 10 | 1350 | 20 | Airstream pulverization + multiple grading | / |

TABLE 2-1-continued

| No. | SiO$_2$:Si (molar ratio) | Pressure (Pa) | Heating temperature (° C.) | Heating time (h) | Classification treatment | Thermal treatment after classification |
|---|---|---|---|---|---|---|
| Example 7 | 1:1 | 10 | 1350 | 20 | Airstream pulverization + multiple grading | 600° C., 2 h |
| Example 8 | 1:1 | 10 | 1350 | 20 | Airstream pulverization + multiple grading | 800° C., 2 h |
| Comparative Example 2 | 1:1 | 10 | 1350 | 20 | Airstream pulverization + multiple grading | 1000° C., 2 h |

Table 2-2 shows the performance parameters of the silicon-based anode active material and graphite particles in Examples 6-8 and Comparative Example 2.

TABLE 2-2

| | I$_2$/I$_1$ | D$_v$50 (μm) | Specific surface area (m$^2 \cdot$ g$^{-1}$) | Capacity per gram* (mAh $\cdot$ g$^{-1}$) | First efficiency |
|---|---|---|---|---|---|
| Graphite particles in Examples 6-8 and Comparative Example 2 | — | 14.1 | 1.06 | 355 | 92.6% |

TABLE 2-2-continued

| | I$_2$/I$_1$ | D$_v$50 (μm) | Specific surface area (m$^2 \cdot$ g$^{-1}$) | Capacity per gram* (mAh $\cdot$ g$^{-1}$) | First efficiency |
|---|---|---|---|---|---|
| Example 6 | 0.41 | 5.6 | 1.28 | 1682 | 69.4% |
| Example 7 | 0.64 | 5.6 | 1.31 | 1672 | 68.7% |
| Example 8 | 1 | 5.6 | 1.28 | 1687 | 68.9% |
| Comparative Example 2 | 2.5 | 5.6 | 1.29 | 1679 | 69.6% |

Table 2-3 shows the performance test results of the lithium ion batteries in Examples 6-8 and Comparative Example 2.

TABLE 2-3

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 6 | 92.5% | 89.5% | 6.2% | 7.4% | 86.7% |
| Example 7 | 91.1% | 87.2% | 7.2% | 8.3% | 86.1% |
| Example 8 | 88.6% | 84.4% | 8.4% | 9.2% | 85.1% |
| Comparative Example 2 | 83.7% | 80.4% | 9.5% | 10.8% | 83.6% |

It can be seen from the performance test results of Examples 6-8 and Comparative Example 2 that when B–A is about 0.3 or less, the cycle performance, deformation resistance and rate performance of the lithium ion battery prepared with silicon oxide SiO$_x$ that meets about 0<I$_2$/I$_1$≤about 1 are better than those of the lithium ion battery prepared with a silicon oxide that meets about 1<I$_2$/I$_1$.

3. The anodes in Examples 9 to 11 and Comparative Examples 3 and 4 were prepared as follows:

(1) The silicon-based anode active materials in Examples 9-11 and Comparative Examples 3 and 4 were obtained by screening and grading a commercial silicon oxide SiO$_x$;

(2) The anodes in Examples 9 to 11 and Comparative Examples 3 and 4 were prepared according to the above method, wherein the average sphericity degrees of the silicon-based particles and graphite particles are about 0.92 and about 0.68, respectively, wherein the graphite particles are the same as those shown in Table 2-2.

Table 3-1 shows the performance parameters of the silicon-based anode active material in Examples 9 to 11 and Comparative Examples 3 and 4.

TABLE 3-1

| No. | Dn10/D$_v$50 | D$_v$50 (μm) | Specific surface area (m$^2 \cdot$ g$^{-1}$) | Capacity per gram* (mAh $\cdot$ g$^{-1}$) | First efficiency |
|---|---|---|---|---|---|
| Example 9 | 0.3 | 5.5 | 1.56 | 1680 | 68.9% |
| Example 10 | 0.5 | 5.6 | 1.42 | 1678 | 69.2% |
| Example 11 | 0.6 | 5.6 | 1.28 | 1682 | 69.4% |
| Comparative Example 3 | 0.05 | 5.4 | 2.29 | 1676 | 68.6% |
| Comparative Example 4 | 0.8 | 5.8 | 1.1 | 1675 | 68.9% |

Table 3-2 shows the performance test results of the lithium ion batteries prepared with the anodes in Examples 9 to 11 and Comparative Examples 3 and 4.

TABLE 3-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 9 | 88.5% | 84.5% | 7.2% | 7.8% | 86.7% |
| Example 10 | 91.1% | 87.2% | 6.8% | 7.5% | 86.1% |
| Example 11 | 92.5% | 89.5% | 6.2% | 7.4% | 86.7% |
| Comparative Example 3 | 83.7% | 80.4% | 9.5% | 10.8% | 86.6% |
| Comparative Example 4 | 83.4% | 81.1% | 8.8% | 9.8% | 86.4% |

It can be seen from the performance test results of Examples 9 to 11 and Comparative Examples 3 and 4 that when B–A is about 0.3 or less, the cycle performance, deformation resistance and rate performance of the lithium ion battery prepared with silicon oxide that meets about 0.3≤Dn10/Dv50≤about 0.6 are better than those of the lithium ion battery prepared with silicon oxide that meets Dn10/Dv50<about 0.3 or about 0.6<Dn10/Dv50.

4. The anodes in Examples 12 to 15 were prepared as follows:

(1) A commercial silicon oxide SiO$_x$ (0.5<x<1.5, Dv50=about 5 μm), the carbon precursor and the oxide precursor MeT$_r$, were added to about 150 mL of ethanol and about 1.47 mL of deionized water, and stirred for about 4 hr until a uniform suspension liquid was formed;

(2) The suspension liquid was spray-dried (inlet temperature: about 220° C., outlet temperature: about 110° C.) to obtain powder;

(3) The powder was sintered at about 250 to 1000° C. for about 0.5 to 24 hr, to obtain a silicon oxide with an oxide MeO$_y$ layer on the surface thereof, which is used as the silicon-based anode active material; and (4) The anodes in Examples 12-15 were prepared according to the above method, wherein the average sphericities of the silicon-based particles and graphite particles are about 0.92 and about 0.68, respectively, wherein the graphite particles are the same as those shown in Table 2-2.

Table 4-1 shows the process conditions for preparing the silicon oxide SiO$_x$ with an oxide MeOy layer in Examples 12-15.

TABLE 4-1

| No. | Commercial silicon oxide SiO$_x$ | Carbon precursor | Oxide precursor MeT$_n$ | Sintering process |
|---|---|---|---|---|
| Example 12 | 100 g | Polyvinylpyrrolidone 2.21 g | 1 g aluminum isopropoxide | N$_2$ flow rate: 1.5 L/min, heating at 3° C./min to 600° C., holding for 2 hrs |
| Example 13 | 100 g | Polyvinylpyrrolidone 2.21 g | 1 g isopropyl titanate | N$_2$ flow rate: 1.5 L/min, heating at 3° C./min to 600° C., holding for 2 hrs |
| Example 14 | 100 g | Polyvinylpyrrolidone 2.21 g | 0.5 g isopropyl titanate + 0.5 g aluminum isopropoxide | N$_2$ flow rate: 1.5 L/min, heating at 3° C./min to 600°C., holding for 2 hrs |
| Example15 | 100 g | Polyvinylpyrrolidone 2.21 g | — | N$_2$ flow rate: 1.5 L/min, heating at 3° C./min to 600° C., holding for 2 hrs |

"—" represents substance not present.

Table 4-2 shows the composition and performance parameters of the silicon-based anode active material in Example 1 and Examples 12 to 15.

TABLE 4-2

| No. | Types of metal elements | Metal content (wt %) | Carbon content in oxide $MeO_y$ layer (wt %) | Specific surface area $(m^2/g)$ | Capacity per gram*(mAh · $g^{-1}$) | First efficiency |
|---|---|---|---|---|---|---|
| Example 1 | — | — | — | 1.28 | 1682 | 69.4% |
| Example 12 | Al | 0.125 | 0.300 | 1.45 | 1682 | 68.6% |
| Example 13 | Ti | 0.125 | 0.300 | 1.47 | 1678 | 74.0% |
| Example 14 | Al + Ti | 0.125 | 0.300 | 1.53 | 1682 | 70.3% |
| Example 15 | Al | 0.000 | 0.300 | 1.38 | 1690 | 74.2% |

"—" represents substance not present.

Table 4-3 shows the performance test results of the lithium ion batteries prepared with the anodes in Example 1 and Examples 12 to 15.

TABLE 4-3

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 12 | 94.0% | 91.7% | 5.6% | 6.8% | 84.4% |
| Example 13 | 93.4% | 90.6% | 6.7% | 7.6% | 85.4% |
| Example 14 | 93.6% | 90.8% | 6.4% | 7.6% | 85.9% |
| Example 15 | 93.1% | 89.9% | 6.8% | 7.7% | 87.7% |

From the test results of Example 1 and Examples 12-15, it can be seen that when B–A is about 0.3 or less, coating an oxide $MeO_y$ layer on the silicon oxide can further improve the cycle performance and/or rate performance, and deformation resistance of the lithium ion batteries.

5. The anodes in Examples 16 to 21 were prepared as follows:

(1) The carbon material (single-wall carbon nanotube (SCNT) and/or multi-wall carbon nanotube (MCNT)) and a polymer were dispersed in water at high speed for about 12 hr to obtain a uniformly mixed slurry;

(2) A commercial silicon oxide $SiO_x$ (0.5<x<1.5, Dv50=about 5 μm) was added to the uniformly mixed slurry in (1) and stirred for about 4 hr to obtain a uniformly mixed dispersion liquid;

(3) The dispersion liquid was spray-dried (inlet temperature: about 200° C., outlet temperature: about 110° C.) to obtain powder, which is used as the silicon-based anode active material; and (4) The anodes in Examples 16-21 were prepared according to the above method, wherein the average sphericity degrees of the silicon-based particles and graphite particles are about 0.92 and about 0.68, respectively, wherein the graphite particles are the same as those shown in Table 2-2.

Table 5-1 shows the composition of the silicon oxide $SiO_x$ with a polymer coating layer in Examples 16 to 21.

TABLE 5-1

| No. | CNT type | CNT content (wt %) | Species of polymer | Polymer content (wt %) |
|---|---|---|---|---|
| Example 1 | — | — | — | — |
| Example 16 | SCNT | 0.10 | CMC-Na | 0.15 |
| Example 17 | MCNT | 0.10 | CMC-Na | 0.15 |
| Example 18 | SCNT: MCNT = 1:1 | 0.10 | CMC-Na | 0.15 |
| Example 19 | SCNT | 0.01 | CMC-Na | 0.15 |
| Example 20 | SCNT | 0.50 | CMC-Na | 0.15 |
| Example 21 | SCNT | 0.10 | CMC-Na | 0.025 |

"—" represents substance not present.

The full names of the English abbreviations in Table 5-1 are as follows:

SCNT: Single-wall carbon nanotube

MCNT: Multi-wall carbon nanotube

CMC-Na: Sodium carboxymethyl cellulose

PVP: Polyvinylpyrrolidone

PVDF: Polyvinylidene fluoride

PAANa: Sodium polyacrylate

Table 5-2 shows the performance test results of the lithium ion batteries prepared with the anodes in Example 1 and Examples 16 to 21.

TABLE 5-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 16 | 94.6% | 92.4% | 6.3% | 7.5% | 87.6% |
| Example 17 | 93.2% | 90.4% | 6.4% | 7.5% | 87.6% |
| Example 18 | 93.7% | 90.8% | 6.4% | 7.8% | 87.3% |
| Example 19 | 94.6% | 92.4% | 6.3% | 7.5% | 87.6% |
| Example 20 | 94.4% | 92.0% | 6.7% | 7.8% | 88.6% |
| Example 21 | 93.2% | 90.2% | 6.6% | 7.7% | 87.6% |

From the test results of Example 1 and Examples 16-21, it can be seen that when B−A is about 0.3, coating a carbon nanotube-containing polymer layer on the silicon oxide can further improve the cycle performance and/or rate performance, and deformation resistance of the lithium ion batteries.

6. The anode active materials in Examples 22 to 24 and Comparative Examples 5 and 6 were prepared as follows:

(1) A silicon-based anode active material with an $I_2/I_1$ value of about 0.5 was prepared, wherein the preparation method was similar to the preparation method of Example 7, except that the thermal treatment temperature after grading was 500° C. and the time was 2 hr;

(2) The silicon-based anode active materials in Examples 22 to 24 and Comparative Examples 5 and 6 were obtained after further grading treatment;

(3) The anodes in Examples 22 to 24 and Comparative Example 5 and 6 were prepared according to the above method, wherein the silicon-based particles with 8-14 graphite particles around the $SiO_x$ particles account for about 70% of the total number of the silicon-based particles, and the average sphericity degrees of the silicon-based particles and graphite particles are about 0.92 and about 0.68, respectively, wherein the graphite particles are the same as those in Table 2-2.

Table 6-1 shows the performance parameters of the silicon-based anode active material in Examples 22 to 24 and Comparative Examples 5 and 6.

TABLE 6-1

| No. | $I_2/I_1$ | Dn10/ $D_v50$ | Specific surface area ($m^2 \cdot g^{-1}$) | Capacity per gram* ($mAh \cdot g^{-1}$) |
|---|---|---|---|---|
| Example 22 | 0.5 | 0.3 | 1.56 | 1678 |
| Example 23 | 0.5 | 0.5 | 1.26 | 1678 |
| Example 24 | 0.5 | 0.6 | 1.23 | 1680 |
| Comparative Example 5 | 0.5 | 0.05 | 2.29 | 1673 |
| Comparative Example 6 | 0.5 | 0.8 | 1.21 | 1674 |

Table 6-2 shows the performance test results of the lithium ion batteries prepared with the anodes in Examples 22 to 24 and Comparative Examples 5 and 6.

TABLE 6-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 22 | 91.2% | 86.1% | 7.1% | 8.4% | 85.7% |
| Example 23 | 91.6% | 87.6% | 6.8% | 8.2% | 86.4% |
| Example 24 | 92.3% | 88.9% | 6.4% | 7.9% | 87.7% |
| Comparative Example 5 | 83.7% | 80.4% | 9.5% | 10.8% | 84.6% |
| Comparative Example 6 | 85.7% | 83.4% | 8.5% | 9.8% | 84.6% |

It can be seen from the performance test results of Examples 22-24 and Comparative Examples 5 and 6 that when B−A is about 0.3 or less and about $0 < I_2/I_1 \leq$ about 1, the cycle performance, deformation resistance and rate performance of the lithium ion battery having an anode prepared with silicon oxide that meets about $0.3 \leq Dn10/Dv50 \leq$ about 0.6 are better than those of the lithium ion battery having an anode prepared with silicon oxide that meets Dn10/Dv50<about 0.3 or about 0.6<Dn10/Dv50.

7. The anodes in Examples 25-28 were prepared as follows.

(1) An oxide $MeO_y$ layer was further coated on the silicon-based anode active material in Example 7 to obtain the silicon-based anode active material in Examples 25 to 28, and the coating method in Examples 25 to 28 was the same as that in Examples 12 to 15; and (2) The anodes in Examples 25-28 were prepared according to the above method, wherein the average sphericity degrees of the silicon-based particles and graphite particles are about 0.92 and about 0.68, respectively, wherein the graphite particles are the same as those shown in Table 2-2.

Table 7-1 shows the composition and performance parameters of the silicon-based anode active material in Example 7 and Examples 25 to 28.

TABLE 7-1

| No. | Types of metal element | Metal element content (wt %) | Carbon content in oxide $MeO_y$ layer (wt %) | Specific surface area $(m^2/g)$ | Capacity per gram*$(mAh \cdot g^{-1})$ | First efficiency |
|---|---|---|---|---|---|---|
| Example 7 | — | — | 0.030 | 1.29 | 1675 | 68.2% |
| Example 25 | Al | 0.125 | 0.300 | 1.42 | 1677 | 68.7% |
| Example 26 | Ti | 0.125 | 0.300 | 1.47 | 1664 | 73.1% |
| Example 27 | Al + Ti | 0.125 | 0.300 | 1.53 | 1675 | 70.4% |
| Example 28 | Al | 0.000 | 0.300 | 1.35 | 1681 | 74.3% |

"—" represents substance not present.

Table 7-2 shows the performance test results of the lithium ion batteries prepared with the anodes in Example 7 and Examples 25 to 28.

TABLE 7-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 7 | 91.1% | 87.2% | 7.2% | 8.3% | 86.1% |
| Example 25 | 93.8% | 91.4% | 5.9% | 6.9% | 84.2% |
| Example 26 | 93.0% | 90.2% | 6.9% | 7.9% | 85.1% |
| Example 27 | 93.6% | 90.7% | 6.7% | 7.8% | 85.3% |
| Example 28 | 92.7% | 89.4% | 7.0% | 7.9% | 87.2% |

From the test results of Example 7 and Examples 25-28, it can be seen that when B−A is about 0.3 or less and about $0 < I_2/I_1 \leq$ about 1, coating an oxide $MeO_y$ layer on the silicon oxide can further improve the cycle performance and/or rate performance, and deformation resistance of the lithium ion batteries.

8. The anodes in Examples 29 to 36 were prepared as follows:

(1) A carbon nanotube-containing polymer layer was further coated on the silicon-based anode active material in Example 7 to obtain the silicon-based anode active material in Examples 29 to 36, and the coating method in Examples 29 to 36 was the same as that in Examples 16 to 21; and (2) The anodes in Examples 29 to 36 were prepared according to the above method, wherein the average sphericity degrees of the silicon-based particles and graphite particles are about 0.92 and about 0.68, respectively, wherein the graphite particles are the same as those shown in Table 2-2.

Table 8-1 shows the compositions of the silicon-based anode active materials having a polymer coating layer in Examples 29 to 36.

TABLE 8-1

| No. | CNT type | CNT content (wt %) | Species of polymer | Polymer content (wt %) |
|---|---|---|---|---|
| Example 7 | — | — | — | — |
| Example 29 | SCNT | 0.10 | CMC-Na | 0.15 |
| Example 30 | MCNT | 0.10 | CMC-Na | 0.15 |
| Example 31 | SCNT:MCNT = 1:1 | 0.10 | CMC-Na | 0.15 |
| Example 32 | SCNT | 0.01 | CMC-Na | 0.15 |

TABLE 8-1-continued

| No. | CNT type | CNT content (wt %) | Species of polymer | Polymer content (wt %) |
|---|---|---|---|---|
| Example 33 | SCNT | 0.50 | CMC-Na | 0.15 |
| Example 34 | SCNT | 0.10 | PVP | 0.15 |
| Example 35 | SCNT | 0.10 | PAANa | 0.15 |
| Example 36 | SCNT | 0.10 | CMC-Na | 0.025 |

"—" represents substance not present.

Table 8-2 shows the performance test results of the lithium ion batteries prepared with the anodes in Example 7 and Examples 29 to 36.

TABLE 8-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 7 | 91.1% | 87.2% | 7.2% | 8.3% | 86.1% |
| Example 29 | 93.1% | 91.4% | 6.7% | 7.8% | 87.6% |
| Example 30 | 92.3% | 89.9% | 6.7% | 8.4% | 87.0% |
| Example 31 | 92.5% | 89.9% | 6.9% | 8.2% | 87.3% |
| Example 32 | 92.8% | 90.4% | 7.3% | 8.5% | 87.4% |

TABLE 8-2-continued

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|-----|------|------|------|------|------|
| Example 33 | 92.6% | 91.0% | 7.4% | 8.3% | 87.9% |
| Example 34 | 92.3% | 89.4% | 6.9% | 8.2% | 87.4% |
| Example 35 | 92.7% | 90.0% | 7.0% | 8.2% | 86.4% |
| Example 36 | 92.5% | 90.1% | 7.1% | 8.2% | 87.6% |

From the test results of Example 7 and Examples 29 to 36, it can be seen that when B−A is about 0.3 or less and about $0<I_2/I_1 \leq$ about 1, coating a carbon nanotube-containing polymer layer on the silicon oxide can further improve the cycle performance and/or rate performance, and deformation resistance of the lithium ion batteries.

9. The anodes in Examples 37 to 41 were prepared as follows:

(1) An oxide $MeO_y$ layer was further coated on the silicon-based anode active material in Example 10 to obtain the silicon-based anode active material in Examples 37-41, and the coating method in Examples 37 to 41 was the same as that in Examples 12 to 15; and (2) The anodes in Examples 37 to 41 were prepared according to the above method, wherein the average sphericity degrees of the silicon-based particles and graphite particles are about 0.92 and about 0.68, respectively, wherein the graphite particles are the same as those shown in Table 2-2.

Table 9-1 shows the compositions and performance parameters of the silicon-based anode active material in Example 10 and Examples 37 to 41.

TABLE 9-1

| No. | Types of metal element | Metal element content (wt %) | Carbon content in oxide $MeO_y$ layer (wt %) | Specific surface area (m²/g) | Capacity per gram*(mAh · g⁻¹) | First efficiency |
|-----|------|------|------|------|------|------|
| Example 10 | — | — | 0.030 | 1.28 | 1682 | 69.4% |
| Example 37 | Al | 0.125 | 0.300 | 1.44 | 1681 | 68.4% |
| Example 38 | Ti | 0.125 | 0.300 | 1.47 | 1677 | 74.1% |
| Example 39 | Al + Ti | 0.125 | 0.300 | 1.54 | 1680 | 70.2% |
| Example 40 | Al | 0.000 | 0.300 | 1.28 | 1688 | 74.1% |
| Example 41 | Al | 0.500 | 0.300 | 1.78 | 1660 | 68.1% |

"—" represents substance not present.

Table 9-2 shows the performance test results of the lithium ion batteries prepared with the anodes in Example 10 and Examples 37 to 41.

TABLE 9-2

| No. | Capacity retention rate after 400 cycles at 25° C. | Capacity retention rate after 200 cycles at 45° C. | Deformation rate after 400 cycles at 25° C. | Deformation rate after 200 cycles at 45° C | Rate performance (2 C) |
|-----|------|------|------|------|------|
| Example 10 | 91.1% | 87.2% | 6.8% | 7.5% | 86.1% |
| Example 37 | 93.0% | 89.7% | 6.1% | 6.9% | 84.2% |
| Example 38 | 92.4% | 88.6% | 7.2% | 7.7% | 85.4% |
| Example 39 | 92.6% | 88.8% | 6.9% | 7.8% | 85.3% |
| Example 40 | 92.1% | 87.9% | 7.2% | 7.8% | 87.4% |
| Example 41 | 93.6% | 90.1% | 5.8% | 6.4% | 82.1% |

From the test results of Example 10 and Examples 37 to 41, it can be seen that when B−A is about 0.3 or less and about $0.3 \leq Dn10/Dv50 \leq$ about 0.6, coating an oxide $MeO_y$ layer on the silicon oxide can further improve the cycle performance and/or rate performance, and deformation resistance of the lithium ion batteries.

10. The anodes in Examples 42 to 48 were prepared as follows:

(1) A carbon nanotube-containing polymer layer was further coated on the silicon-based anode active material in Example 10 to obtain the silicon-based anode active material in Examples 42 to 48, and the coating method in Examples 42 to 48 was the same as that in Examples 16 to 21; and (2) The anodes in Examples 42 to 48 were prepared according to the above method, wherein the average sphericity degrees of the silicon-based particles and graphite particles are about 0.92 and about 0.68, respectively, wherein the graphite particles are the same as those shown in Table 2-2.

Table 10-1 shows the compositions of the silicon-based anode active material in Example 10 and Examples 42 to 48.

TABLE 10-1

| No. | CNT type | CNT content (wt %) | Types of polymer | Polymer content (wt %) |
|-----|------|------|------|------|
| Example 10 | — | — | — | — |
| Example 42 | SCNT | 0.10 | CMC-Na | 0.15 |
| Example 43 | MCNT | 0.10 | CMC-Na | 0.15 |
| Example 44 | SCNT:MCNT = 1:1 | 0.10 | CMC-Na | 0.15 |
| Example 45 | SCNT | 0.10 | PVP | 0.15 |

TABLE 10-1-continued

| No. | CNT type | CNT content (wt %) | Types of polymer | Polymer content (wt %) |
|-----|------|------|------|------|
| Example 46 | SCNT | 0.10 | PVDF | 0.15 |
| Example 47 | SCNT | 0.10 | PAANa | 0.15 |
| Example 48 | SCNT | 0.10 | CMC-Na | 0.025 |

"—" represents substance not present.

Table 10-2 shows the performance test results of the lithium ion batteries prepared with the anode active materials in Example 10 and Examples 42 to 48.

TABLE 10-2

| No. | Capacity retention rate after 400 cycles at 25° C. | Capacity retention rate after 200 cycles at 45° C. | Defor- mation rate after 400 cycles at 25° C. | Defor- mation rate after 200 cycles at 45° C | Rate perfor- mance (2 C) |
|---|---|---|---|---|---|
| Example 10 | 91.1% | 87.2% | 6.8% | 7.5% | 86.1% |
| Example 42 | 93.0% | 91.3% | 6.9% | 7.7% | 87.7% |
| Example 43 | 92.2% | 89.8% | 6.8% | 8.3% | 87.2% |
| Example 44 | 92.6% | 89.8% | 6.9% | 8.1% | 87.1% |
| Example 45 | 92.4% | 89.2% | 6.8% | 8.3% | 87.2% |
| Example 46 | 92.1% | 89.4% | 7.0% | 8.2% | 85.3% |
| Example 47 | 92.5% | 90.2% | 7.1% | 8.1% | 86.5% |
| Example 48 | 92.1% | 90.0% | 7.2% | 8.3% | 87.5% |

From the test results of Example 10 and Examples 42 to 48, it can be seen that when B−A is about 0.3 or less and about $0.3 \leq Dn10/Dv50 \leq$ about 0.6, coating a carbon nanotube-containing polymer layer on the silicon oxide can further improve the cycle performance and/or rate performance, and deformation resistance of the lithium ion batteries.

11. The anodes in Examples 49-58 were prepared as follows:

(1) A carbon nanotube-containing polymer layer was further coated on the silicon-based anode active material in Example 12 to obtain the silicon-based anode active material in Examples 49 to 58, and the coating method in Examples 49 to 58 was the same as that in Examples 16 to 21; and (2) The anodes in Examples 49 to 58 were prepared according to the above method, wherein the average sphericity degrees of the silicon-based particles and graphite particles are about 0.92 and about 0.68, respectively, wherein the graphite particles are the same as those shown in Table 2-2.

Table 11-1 shows the compositions of the silicon-based anode active material in Example 12 and Examples 49 to 58.

TABLE 11-1

| No. | CNT type | CNT content (wt %) | Types of polymer | Polymer content (wt %) |
|---|---|---|---|---|
| Example 12 | — | — | — | — |
| Example 49 | SCNT | 0.10 | CMC-Na | 0.15 |
| Example 50 | MCNT | 0.10 | CMC-Na | 0.15 |
| Example 51 | SCNT:MCNT = 1:1 | 0.10 | CMC-Na | 0.15 |
| Example 52 | SCNT | 0.01 | CMC-Na | 0.15 |
| Example 53 | SCNT | 0.50 | CMC-Na | 0.15 |
| Example 54 | SCNT | 0.10 | PVP | 0.15 |
| Example 55 | SCNT | 0.10 | PVDF | 0.15 |
| Example 56 | SCNT | 0.10 | PAANa | 0.15 |
| Example 57 | SCNT | 0.10 | CMC-Na | 0.4 |
| Example 58 | SCNT | 0.10 | CMC-Na | 0.025 |

"—" represents substance not present.

Table 11-2 shows the performance test results of the lithium ion batteries prepared with the anode active materials in Example 12 and Examples 49 to 58.

TABLE 11-2

| No. | Capacity retention rate after 400 cycles at 25° C. | Capacity retention rate after 200 cycles at 45° C. | Defor- mation rate after 400 cycles at 25° C. | Defor- mation rate after 200 cycles at 45° C. | Rate perfor- mance (2 C) |
|---|---|---|---|---|---|
| Example 12 | 94.0% | 91.7% | 5.6% | 6.8% | 84.4% |
| Example 49 | 96.0% | 94.3% | 5.5% | 7.1% | 84.6% |
| Example 50 | 95.2% | 92.8% | 5.6% | 7.5% | 84.5% |
| Example 51 | 95.6% | 92.8% | 5.7% | 7.6% | 84.3% |
| Example 52 | 95.5% | 93.3% | 6.4% | 7.4% | 85.3% |
| Example 53 | 95.4% | 93.1% | 6.5% | 7.6% | 85.7% |
| Example 54 | 95.4% | 92.2% | 5.8% | 7.7% | 84.2% |
| Example 55 | 95.1% | 92.1% | 6.0% | 7.5% | 85.3% |
| Example 56 | 95.5% | 92.8% | 6.1% | 7.7% | 84.5% |
| Example 57 | 95.3% | 92.1% | 6.3% | 7.3% | 82.4% |
| Example 58 | 95.1% | 92.0% | 6.2% | 7.8% | 85.5% |

From the test results of Example 12 and Examples 49-58, it can be seen that when B−A is about 0.3 or less, further coating a carbon nanotube-containing polymer layer on the silicon oxide which has an oxide $MeO_y$ layer on the surface thereof can further improve the cycle performance and/or rate performance, and deformation resistance of the lithium ion batteries.

12. The anodes in Examples 59 to 63 were prepared as follows:

(1) An oxide $MeO_y$ layer was further coated on the silicon-based anode active material in Example 23 to obtain the silicon-based anode active material in Examples 59 to 63, and the coating method in Examples 59 to 63 was the same as that in Examples 12 to 15; and (2) The anodes in Examples 59 to 63 were prepared according to the above method, wherein the average sphericity degrees of the silicon-based particles and graphite particles are about 0.92 and about 0.68, respectively, wherein the graphite particles are the same as those shown in Table 2-2.

Table 12-1 shows the compositions and performance parameters of the silicon-based anode active material in Example 23 and Examples 59 to 63.

TABLE 12-1

| No. | Types of metal element | Metal element content (wt %) | Carbon content in oxide $MeO_y$ layer (wt %) | Specific surface area ($m^2/g$) | Capacity per gram*(mAh · $g^{-1}$) | First efficiency |
|---|---|---|---|---|---|---|
| Example 23 | — | — | 0.030 | 1.28 | 1682 | 69.4% |
| Example 59 | Al | 0.125 | 0.300 | 1.45 | 1681 | 68.4% |
| Example 60 | Ti | 0.125 | 0.300 | 1.47 | 1677 | 74.1% |
| Example 61 | Al + Ti | 0.125 | 0.300 | 1.53 | 1680 | 70.2% |

TABLE 12-1-continued

| No. | Types of metal element | Metal element content (wt %) | Carbon content in oxide MeO$_y$ layer (wt %) | Specific surface area (m$^2$/g) | Capacity per gram*(mAh · g$^{-1}$) | First efficiency |
|-----|-----|-----|-----|-----|-----|-----|
| Example 62 | Al | 0.000 | 0.300 | 1.38 | 1688 | 74.1% |
| Example 63 | Al | 0.500 | 0.300 | 1.98 | 1660 | 68.1% |

"—" represents substance not present.

Table 12-2 shows the performance test results of the lithium ion batteries prepared with the anodes in Example 23 and Examples 59 to 63.

TABLE 12-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|-----|-----|-----|-----|-----|-----|
| Example 23 | 92.1% | 88.6% | 6.7% | 7.8% | 85.4% |
| Example 59 | 94.0% | 90.7% | 6.1% | 6.9% | 84.2% |
| Example 60 | 93.4% | 89.6% | 7.2% | 7.7% | 85.4% |
| Example 61 | 93.6% | 89.8% | 6.9% | 7.8% | 85.3% |
| Example 62 | 93.1% | 88.9% | 7.2% | 7.8% | 87.4% |
| Example 63 | 94.6% | 91.1% | 5.8% | 6.4% | 82.1% |

From the test results of Example 23 and Examples 59 to 63, it can be seen that when B−A is about 0.3 or less, about 0<I$_2$/I$_1$≤about 1 and about 0.3≤Dn10/Dv50≤about 0.6, coating an oxide MeO$_y$ layer on the silicon oxide can further improve the cycle performance and/or rate performance, and deformation resistance of the lithium ion batteries.

13. The anodes in Examples 64 to 73 were prepared as follows:

(1) A carbon nanotube-containing polymer layer was further coated on the silicon-based anode active material in Example 23 to obtain the silicon-based anode active material in Examples 64 to 73, and the coating method in Examples 64 to 73 was the same as that in Examples 16 to 21; and (2) The anodes in Examples 64 to 73 were prepared according to the above method, wherein the average sphericity degrees of the silicon-based particles and graphite particles are about 0.92 and about 0.68, respectively, wherein the graphite particles are the same as those shown in Table 2-2.

Table 13-1 shows the compositions of the silicon-based anode active material in Example 23 and Examples 64 to 73.

TABLE 13-1

| No. | CNT type | CNT content (wt %) | Species of polymer | Polymer content (wt %) |
|-----|-----|-----|-----|-----|
| Example 23 | — | — | — | — |
| Example 64 | SCNT | 0.10 | CMC-Na | 0.15 |
| Example 65 | MCNT | 0.10 | CMC-Na | 0.15 |
| Example 66 | SCNT:MCNT = 1:1 | 0.10 | CMC-Na | 0.15 |
| Example 67 | SCNT | 0.01 | CMC-Na | 0.15 |
| Example 68 | SCNT | 0.50 | CMC-Na | 0.15 |
| Example 69 | SCNT | 0.10 | PVP | 0.15 |
| Example 70 | SCNT | 0.10 | PVDF | 0.15 |

TABLE 13-1-continued

| No. | CNT type | CNT content (wt %) | Species of polymer | Polymer content (wt %) |
|-----|-----|-----|-----|-----|
| Example 71 | SCNT | 0.10 | PAANa | 0.15 |
| Example 72 | SCNT | 0.10 | CMC-Na | 0.4 |
| Example 73 | SCNT | 0.10 | CMC-Na | 0.025 |

"—" represents substance not present.

Table 13-2 shows the performance test results of the lithium ion batteries prepared with the anodes in Example 23 and Examples 64 to 73.

TABLE 13-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|-----|-----|-----|-----|-----|-----|
| Example 23 | 92.1% | 88.6% | 6.7% | 7.8% | 85.4% |
| Example 64 | 94.0% | 91.3% | 5.5% | 8.1% | 84.6% |
| Example 65 | 93.1% | 89.9% | 5.6% | 8.5% | 84.3% |
| Example 66 | 93.6% | 89.8% | 5.7% | 8.6% | 84.1% |
| Example 67 | 93.5% | 90.4% | 6.4% | 8.9% | 85.3% |
| Example 68 | 93.4% | 90.1% | 6.5% | 9.1% | 85.6% |
| Example 69 | 93.3% | 89.2% | 5.8% | 8.7% | 84.1% |
| Example 70 | 93.0% | 89.1% | 6.0% | 8.5% | 85.5% |
| Example 71 | 93.5% | 89.7% | 6.1% | 8.7% | 84.4% |
| Example 72 | 93.3% | 89.1% | 6.3% | 8.3% | 85.3% |
| Example 73 | 93.0% | 89.0% | 6.2% | 8.8% | 85.7% |

From the test results of Example 23 and Examples 64 to 73, it can be seen that when B−A is about 0.3 or less, about 0<I$_2$/I$_1$≤about 1 and about 0.3≤Dn10/Dv50≤about 0.6, coating a carbon nanotube-containing polymer layer on the silicon oxide can further improve the cycle performance and/or rate performance, and deformation resistance of the lithium ion batteries.

14. The anodes in Examples 74 to 82 were prepared as follows:

(1) A carbon nanotube-containing polymer layer was further coated on the silicon-based anode active material in Example 41 to obtain the silicon-based anode active material in Examples 74 to 82, and the coating method in Examples 74 to 82 was the same as that in Examples 16 to 21; and (2) The anodes in Examples 74 to 82 were prepared according to the above method, wherein the average sphericity degrees of the silicon-based particles and graphite particles are about 0.92 and about 0.68, respectively, wherein the graphite particles are the same as those shown in Table 2-2.

Table 14-1 shows the compositions of the silicon-based anode active material in Example 41 and Examples 74 to 82.

TABLE 14-1

| No. | CNT type | CNT content (wt %) | Species of polymer | Polymer content (wt %) |
|---|---|---|---|---|
| Example 41 | — | — | — | — |
| Example 74 | SCNT | 0.10 | CMC-Na | 0.15 |
| Example 75 | MCNT | 0.10 | CMC-Na | 0.15 |
| Example 76 | SCNT:MCNT = 1:1 | 0.10 | CMC-Na | 0.15 |
| Example 77 | SCNT | 0.01 | CMC-Na | 0.15 |
| Example 78 | SCNT | 0.10 | PVP | 0.15 |
| Example 79 | SCNT | 0.10 | PVDF | 0.15 |
| Example 80 | SCNT | 0.10 | PAANa | 0.15 |
| Example 81 | SCNT | 0.10 | CMC-Na | 0.4 |
| Example 82 | SCNT | 0.10 | CMC-Na | 0.025 |

"—" represents substance not present.

Table 14-2 shows the performance test results of the lithium ion batteries prepared with the anode active materials in Example 41 and Examples 74 to 82.

TABLE 14-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 41 | 93.6% | 90.1% | 5.8% | 6.4% | 82.1% |
| Example 74 | 95.5% | 92.4% | 5.6% | 8.0% | 84.6% |
| Example 75 | 94.6% | 91.4% | 5.7% | 8.2% | 84.3% |
| Example 76 | 95.1% | 92.2% | 5.7% | 8.4% | 83.1% |
| Example 77 | 95.1% | 90.7% | 6.3% | 8.7% | 85.2% |
| Example 78 | 94.8% | 91.2% | 5.9% | 8.6% | 84.0% |
| Example 79 | 94.5% | 90.6% | 6.1% | 8.4% | 85.2% |
| Example 80 | 95.0% | 90.9% | 6.0% | 8.5% | 84.0% |
| Example 81 | 94.6% | 90.6% | 6.4% | 8.2% | 82.1% |
| Example 82 | 94.4% | 90.5% | 6.1% | 8.5% | 85.4% |

From the test results of Example 41 and Examples 74 to 82, it can be seen that when B−A is about 0.3 or less and about $0.3 \leq Dn10/Dv50 \leq$ about 0.6, coating a carbon nanotube-containing polymer layer on the silicon oxide which has an oxide $MeO_y$ layer on the surface thereof can further improve the cycle performance and/or rate performance of the lithium ion batteries, while the deformation rate of the batteries has no obvious change.

15. The anodes in Examples 83 to 90 were prepared as follows:

(1) A carbon nanotube-containing polymer layer was further coated on the silicon-based active material in Example 63 to obtain the silicon-based anode active material in Examples 83 to 90, and the coating method in Examples 83 to 90 was the same as that in Examples 16 to 21; and (2) The anodes in Examples 83 to 90 were prepared according to the above method, wherein the average sphericity degrees of the silicon-based particles and graphite particles are about 0.92 and about 0.68, respectively, wherein the graphite particles are the same as those shown in Table 2-2.

Table 15-1 shows the compositions of the silicon-based anode active material in Example 63 and Examples 83 to 90.

TABLE 15-1

| No. | CNT type | CNT content (wt %) | Types of polymer | Polymer content (wt %) |
|---|---|---|---|---|
| Example 63 | — | — | — | — |
| Example 83 | SCNT | 0.10 | CMC-Na | 0.15 |
| Example 84 | MCNT | 0.10 | CMC-Na | 0.15 |
| Example 85 | SCNT:MCNT = 1:1 | 0.10 | CMC-Na | 0.15 |
| Example 86 | SCNT | 0.10 | PVP | 0.15 |
| Example 87 | SCNT | 0.10 | PVDF | 0.15 |
| Example 88 | SCNT | 0.10 | PAANa | 0.15 |
| Example 89 | SCNT | 0.10 | CMC-Na | 0.4 |
| Example 90 | SCNT | 0.10 | CMC-Na | 0.025 |

"—" represents substance not present.

Table 15-2 shows the performance test results of the lithium ion batteries prepared with the anodes in Example 63 and Examples 83 to 90.

TABLE 15-2

| No. | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 63 | 94.6% | 91.1% | 5.8% | 6.4% | 82.1% |
| Example 83 | 96.5% | 93.3% | 5.5% | 8.1% | 84.6% |
| Example 84 | 95.5% | 91.9% | 5.6% | 8.5% | 84.3% |
| Example 85 | 96.2% | 91.8% | 5.7% | 8.6% | 84.1% |
| Example 86 | 95.7% | 91.2% | 5.8% | 8.7% | 84.1% |
| Example 87 | 95.4% | 91.1% | 6.0% | 8.5% | 85.5% |
| Example 88 | 96.1% | 91.7% | 6.1% | 8.7% | 84.4% |
| Example 89 | 95.7% | 91.1% | 6.5% | 8.3% | 82.3% |
| Example 90 | 95.3% | 91.0% | 6.2% | 8.8% | 85.7% |

From the performance test results of Example 63 and Examples 83 to 90, it can be seen that when B−A is about 0.3 or less, about $0 < I_2/I_1 \leq$ about 1 and about $0.3 \leq Dn10/Dv50 \leq$ about 0.6, coating a carbon nanotube-containing polymer layer on the silicon oxide which has an oxide $MeO_y$ layer on the surface thereof can further improve the cycle performance and/or rate performance of the lithium ion batteries, while the deformation rate of the batteries has no obvious change.

References throughout the specification to "some embodiments," "partial embodiments," "one embodiment," "another example," "example," "specific example" or "partial examples" means that at least one embodiment or example of the application includes specific features, structures, materials or characteristics described in the embodiments or examples. Thus, the descriptions appearing throughout the specification, such as "in some embodiments," "in an embodiment," "in one embodiment," "in another example," "in an example," "in a particular example" or "for example," are not necessarily the same embodiment or example in the application. Furthermore, the particular features, structures, materials or characteristics herein may be combined in any suitable manner in one or more embodiments or examples.

Although illustrative embodiments have been demonstrated and described, it is to be understood by those skilled in the art that the above-mentioned embodiments cannot be construed as limitations to the present application, and that changes, replacements and modifications can be made to the embodiments without departing from the spirit, principle, and scope of the present application.

What is claimed is:

1. An anode material, comprising silicon-based particles and graphite particles, wherein an average sphericity degree of the graphite particles is A, an average sphericity degree of the silicon-based particles is B, and about $0 < B - A \leq$ about 0.3;

wherein the average sphericity degree of the graphite particles ranges from about 0.5 to about 0.68, and wherein the average sphericity degree of the silicon-based particles ranges from about 0.8 to about 0.92;

wherein the silicon-based particles have a particle size distribution meeting: $0.3 \leq Dn10/Dv50 \leq 0.4$.

2. The anode material according to claim 1, wherein in an X-ray diffraction pattern of the silicon-based particles, the highest intensity at $2\theta$ within the range of about 28.0° to 29.0° is $I_2$, and the highest intensity at $2\theta$ within the range of about 20.5° to 21.5° is $I_1$, wherein about $0 < I_2/I_1 \leq$ about 1.

3. The anode material according to claim 1, wherein the silicon-based particles comprise a silicon composite substrate and an oxide $MeO_y$ layer, wherein the oxide $MeO_y$ layer is coated on at least a portion of the silicon composite substrate, wherein Me includes at least one of Al, Si, Ti, Mn, V, Cr, Co or Zr, and y is 0.5 to 3; and wherein the oxide $MeO_y$ layer comprises a carbon material.

4. The anode material according to claim 1, wherein the silicon-based particles comprise a silicon composite substrate and a polymer layer, wherein the polymer layer is coated on at least a portion of the silicon composite substrate, wherein the polymer layer comprises a carbon material; and wherein the polymer layer has a thickness of about 1 nm to about 150 nm.

5. The anode material according to claim 2, wherein the silicon-based particles comprise a silicon composite substrate and an oxide $MeO_y$ layer, wherein the oxide $MeO_y$ layer is coated on at least a portion of the silicon composite substrate, wherein Me includes at least one of Al, Si, Ti, Mn, V, Cr, Co or Zr, and y is 0.5 to 3; and wherein the oxide $MeO_y$ layer comprises a carbon material.

6. The anode material according to claim 2, wherein the silicon-based particles comprise a silicon composite substrate and a polymer layer, wherein the polymer layer is coated on at least a portion of the silicon composite substrate, wherein the polymer layer comprises a carbon material; and wherein the polymer layer has a thickness of about 1 nm to about 150 nm.

7. The anode material according to claim 3, wherein the silicon composite substrate comprises $SiO_x$, wherein $0.6 \leq x \leq 1.5$.

8. The anode material according to claim 3, wherein the silicon composite substrate comprises nano-Si crystalline grains, SiO, $SiO_2$, or any combination thereof.

9. The anode material according to claim 8, wherein the nano-Si crystalline grains have a size of 100 nm or less.

10. The anode material according to claim 3, wherein a thickness of the oxide $MeO_y$ layer is about 0.5 nm to 1000 nm.

11. The anode material according to claim 3, wherein a weight percentage of the Me element is about 0.005 to 1.5 wt %.

12. The anode material according to claim 1, wherein the graphite particles have a scattering peak $I_{1330}$ at about 1330 cm$^{-1}$ and a scattering peak $I_{1580}$ at about 1580 cm$^{-1}$ in Raman spectroscopy, wherein the $I_{1330}/I_{1580}$ ratio meets: about $0.7 < I_{1330}/I_{1580} <$ about 2.0.

13. An electronic device, comprising an electrochemical device, the electrochemical device comprising an anode material, wherein the anode material comprises silicon-based particles and graphite particles, wherein an average sphericity degree of the graphite particles is A, an average sphericity degree of the silicon-based particles is B, and about $0 < B - A \leq$ about 0.3;

wherein the average sphericity degree of the graphite particles ranges from about 0.5 to about 0.68, and wherein the average sphericity degree of the silicon-based particles ranges from about 0.8 to about 0.92;

wherein the silicon-based particles have a particle size distribution meeting: $0.3 \leq Dn10/Dv50 \leq 0.4$.

14. The anode material according to claim 1, wherein $0.3 \leq Dn10/Dv50 \leq$ about 0.35.

15. The electronic device according to claim 13, wherein $0.3 \leq Dn10/Dv50 \leq$ about 0.35.

\* \* \* \* \*